(12) United States Patent
Yamada

(10) Patent No.: US 7,880,948 B2
(45) Date of Patent: Feb. 1, 2011

(54) SCANNING PROJECTION DEVICE

(75) Inventor: Keiko Yamada, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/679,111

(22) PCT Filed: Sep. 18, 2008

(86) PCT No.: PCT/JP2008/066832

§ 371 (c)(1),
(2), (4) Date: Mar. 19, 2010

(87) PCT Pub. No.: WO2009/041342

PCT Pub. Date: Apr. 2, 2009

(65) Prior Publication Data

US 2010/0253991 A1 Oct. 7, 2010

(30) Foreign Application Priority Data

Sep. 26, 2007 (JP) .............................. 2007-248517

(51) Int. Cl.
*G02B 26/08* (2006.01)
(52) U.S. Cl. .............. 359/208.2; 359/207.2; 359/207.5; 353/70; 353/99
(58) Field of Classification Search ... 359/196.1–226.2, 359/649–651; 353/70, 99
See application file for complete search history.

(56) References Cited

U.S. PATENT DOCUMENTS

| | | | |
|---|---|---|---|
| 2005/0190419 A1 | 9/2005 | Ishihara | 359/202 |
| 2006/0139718 A1 | 6/2006 | Ishihara | 359/205 |
| 2007/0171497 A1 | 7/2007 | Ishihara | 359/202 |
| 2010/0118281 A1* | 5/2010 | Yamada et al. | 353/70 |

FOREIGN PATENT DOCUMENTS

| | | |
|---|---|---|
| CN | 1794037 A | 6/2006 |
| EP | 1 566 972 A2 | 8/2005 |
| EP | 1 674 914 A1 | 6/2006 |
| JP | 2005-234157 A | 9/2005 |
| JP | 2006-178346 A | 7/2006 |
| JP | 2007-188251 A | 8/2007 |
| WO | WO 2009/041342 A1 | 4/2009 |

* cited by examiner

*Primary Examiner*—James Phan
(74) *Attorney, Agent, or Firm*—Sidley Austin LLP

(57) ABSTRACT

Scanning projection device PJ two-dimensionally deflects a beam emitted from light source unit 1 and performs scanning with deflection element 3, and projects the beam obliquely on screen SC with projection optical system 7. By defining a range of an incident angle to screen SC properly, projection optical system 7 does not disturb an observation of images, and a correction of a spot shape does not become difficult. Further, by defining a ratio of scan-angle magnifications between in the vertical direction and the horizontal direction properly, difference in resolution between in the vertical direction and the horizontal direction can be reduced, and a high-quality and excellent image can be displayed, even when a beam obliquely projected.

11 Claims, 21 Drawing Sheets

SCANNING PROJECTION DEVICE

RELATED APPLICATIONS

This application is a U.S. National Phase Application under 35 U.S.C. 371 of International Application No. PCT/JP2008/066832, filed with Japanese Patent Office on Sept. 18, 2008, which claims priority to Japanese Patent Application No. 2007-248517, filed Sep. 26, 2007.

TECHNICAL FIELD

The present invention relates to a small-sized scanning projection device which is applied to a device such as a pocket projector, data projector, rear-projection television, and which displays an image on a scan surface by two-dimensionally deflecting a light flux for scanning.

BACKGROUND ART

As a conventional small-sized projection device, there have been known projectors employing an optical modulator such as DMD (Digital Micromirror Device; produced by U.S. Texas Instruments Incorporated) and a liquid crystal element. A system which enlarges and projects images to be displayed with the optical modulator is called a microdisplay system. In microdisplay projectors, an illumination optical system and a projection optical system become large in size in order to project a two-dimensional image, which restricts the downsizing of devices.

On the other hand, development of what is called a laser scanning projector has been prosperous, in recent years. An laser scanning system is a system to project (display) an image on a scan surface by deflecting a laser beam emitted by a light source with a small mirror such as a MEMS (Micro Electro Mechanical Systems) mirror while modulating output of the laser beam, and by scanning the scan surface. A laser scanning projector exhibits various advantages as followings, which enables to downsize the entire device: (1) a scanning mirror is smaller in size than DMD; (2) since a laser light source is employed as a light source and a laser beam is simply emitted to a scanning mirror, an illumination optical system becomes smaller in size, too; and (3) since the scan surface is simply scanned with a spot (a light spot), a projection optical system becomes smaller in size, too.

Small-sized projection devices employing the laser scanning system have been disclosed in Patent Literatures 1 and 2, for example. In these projection devices, a galvanometer mirror and a MEMS mirror are employed as an optical scanning means to obliquely project a light flux from the optical scanning means to a screen. By driving the galvanometer mirror and MEMS mirror to cause their resonance, these mirrors can be driven at high speed with large amplitude (mechanical deflection angle), to scan a scan surface. Further, when a light beam is obliquely projected to shift a scanned image upward, the scanned image can be displayed at a position easily viewed by observers. Furthermore, when a scanning image display apparatus equipped with a projection device is placed on a table, a scanned image can be fully displayed on a projection area without being displayed on the table.

Patent Literature 1: JP-A No. 2006-178346

Patent Literature 2: JP-A No. 2005-234157

DISCLOSURE OF INVENTION

Technical Problem

Incidentally, in a structure such that a scanning projection device performs an oblique projection, the larger the angle of the oblique projection to the scan surface becomes, the more an irradiated spot on the scan surface is elongated in a vertical direction. As a result, it causes a resolution difference between in the vertical direction and in the horizontal direction, and displaying an excellent image ends in failure. However, Patent Literatures 1 and 2 describe none of the way to correct the resolution difference between in the vertical and lateral directions. A scanning projection device is capable of realizing a small-sized apparatus as described above, but is further required to be capable of displaying images with high quality.

The present invention has been achieved to solve the above problem, and its object is to provide a small-sized scanning projection device with a compact structure, capable of correcting the resolution difference between in the vertical and horizontal directions of an image area caused when a beam is obliquely projected, to display an excellent image.

Solution to Problem

The problems of the present invention are solved by the following structures.

1. A scanning projection device comprising:

a light source means;

a deflection member deflecting a beam emitted from the light source means in a first scanning direction and a second scanning direction which are perpendicular to each other; and a projection optical system guiding the beam deflected by the deflection member onto a scan surface, wherein the scanning projection device two-dimensionally scans an image area on the scan surface with the beam, the first scanning direction is identical with a short-side direction of the image area on the scan surface, and the scanning projection device satisfies the following conditional expressions (1) and (2).

$$5 < \theta in < 60 \quad (1)$$

$$1.0 < A/(B \times C) < 2.5 \quad (2)$$

In these expressions, the following expressions hold:

$$A = \{Sh/Sv\} \times \tan(2\theta v),$$

$$B = 2\tan(\theta h) \times \cos^2(\theta in),$$

$$C = 1 - \tan(\theta in) \times \tan(2\theta v),$$

where $\theta in$ is an incident angle of a ray entering the scan surface at a minimum angle among rays entering the scan surface within a cross section which includes a principal ray at a center of the image area and is parallel with the short-side direction of the image area, Sh is a length of the image area on the scan surface in a long-side direction, Sv is a length of the image area in the short-side direction, $\theta h$ is a maximum optical-scan angle in the long-side direction of the image area, and $\theta v$ is a maximum optical-scan angle in the short-side direction of the image area. The principal ray at the center of the image area means a ray which is emitted from the light source means, then passes a center of a diaphragm, and enters the center of the image area on the scan surface.

2. The scanning projection device of Item 1,
wherein the scanning projection device satisfies the following conditional expression (2a).

$$1.0 < A/(B \times C) < 2.0 \tag{2a}$$

3. The scanning projection device of Item 1 or 2,
wherein the projection optical system comprises at least one free-form surface with rotational asymmetry.

4. The scanning projection device of any one of Items 1 to 3,
wherein the projection optical system comprises a reflection surface, and
wherein, on the reflection surface, a first area is defined as an area where a ray entering a lower side of an image area intersects with the reflection surface within a cross section which includes the principal ray at the center of the image surface and is parallel with the short-side direction of the image area, and a second area is defined as an area where a ray entering a upper side of the image area intersects with the reflection surface within the cross section, and
wherein the reflection surface is symmetrical about the cross section, and has a shape that the first area protrudes toward a side from which a ray enters, and
the reflection surface has a shape with larger positive curvature at a cross section which passes through the first area and is perpendicular to the first scanning direction, than a shape at a cross section which passes through the second area and is perpendicular to the first scanning direction.

5. The scanning projection device of Item 4,
wherein the reflection surface has a shape that a curvature becomes larger in a positive direction at a point moving from the first area in a direction which is the second scanning direction and is a direction that the point becomes more distant from the cross section including the principal ray at the center of the image area.

6. The scanning projection device of Item 4 or 5,
wherein the reflection surface is arranged at a position closest to the scan surface.

7. The scanning projection device of any one of Items 4 to 6,
wherein the reflection surface has a shape that the curvature changes in a negative direction at a point moving from the second area in a direction which is the second scanning direction and is a direction that the point becomes more distant from the cross section including the principal ray at the center of the image area.

8. The scanning type projection device of any one of Items 4 to 7,
wherein the reflection surface is defined as a second reflection surface, and the projection optical system further comprises a first reflection surface, and
wherein an optical path of the projection optical system is folded by the first reflection surface and the second reflection surface to be included in a cross section which includes the principal ray at the center of the image area and is parallel with the short-side direction of the image area.

9. The scanning projection device of Item 8,
wherein, on the first reflection surface, a curvature along the second scanning direction at a position around an intersection of a ray entering a lower side of an image area with the first reflection surface, is larger in a negative direction than a curvature along the second scanning surface at a position around an intersection of a ray entering an upper side of the image area with the first reflection surface.

10. The scanning projection device of Item 9,
wherein the projection optical system includes at least three surfaces with curvature.

11. The scanning projection device of any one of Items 1 to 10, further comprising an incident optical system guiding the beam emitted from the light source means to the deflection member,
wherein the incident optical systems comprises an anamorphic lens whose curvature differs between in the first scanning direction and in the second scanning direction.

Advantageous Effects of the Invention

According to the present invention, the device can be easily downsized by employing a deflection member which two-dimensionally deflects an incident light and performs scanning. Further, because of an oblique projection, a distance from the projection optical system to the scan surface can be reduced, which makes the entire structure compact. When the conditional expression (1) is satisfied, the projection optical system does not disturb observing images, and a correction of a spot shape does not become difficult. When the condition expression (2) is satisfied, the resolution difference between in the vertical and horizontal directions can be reduced and an excellent and high-quality image can be displayed even in case of oblique projection.

Each of FIGS. 8a through 8e is a sectional view of the above deflection element.

Figure 9A:
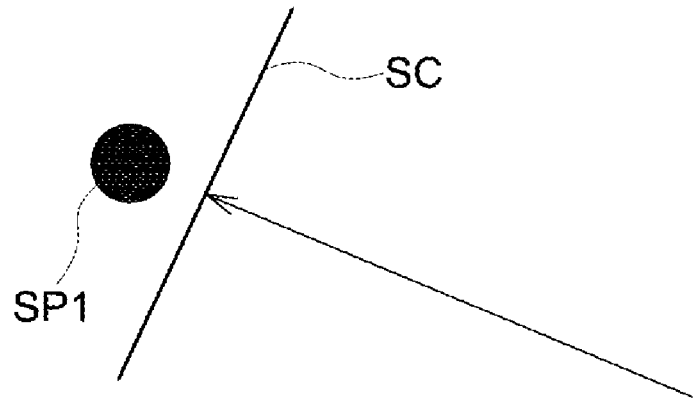
Figure 9B:
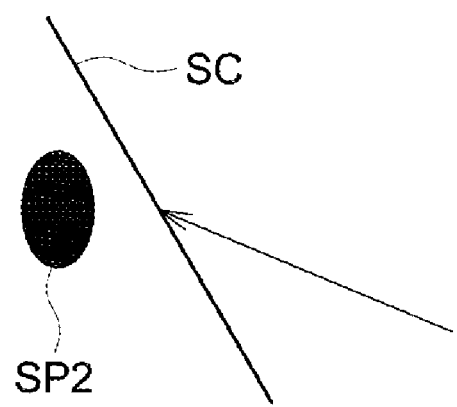

FIG. 9a is a diagram showing a spot shape formed when a beam perpendicularly enters a screen, and FIG. 9b is a diagram showing a spot shape formed when a beam obliquely enters the screen.

Figure 10:
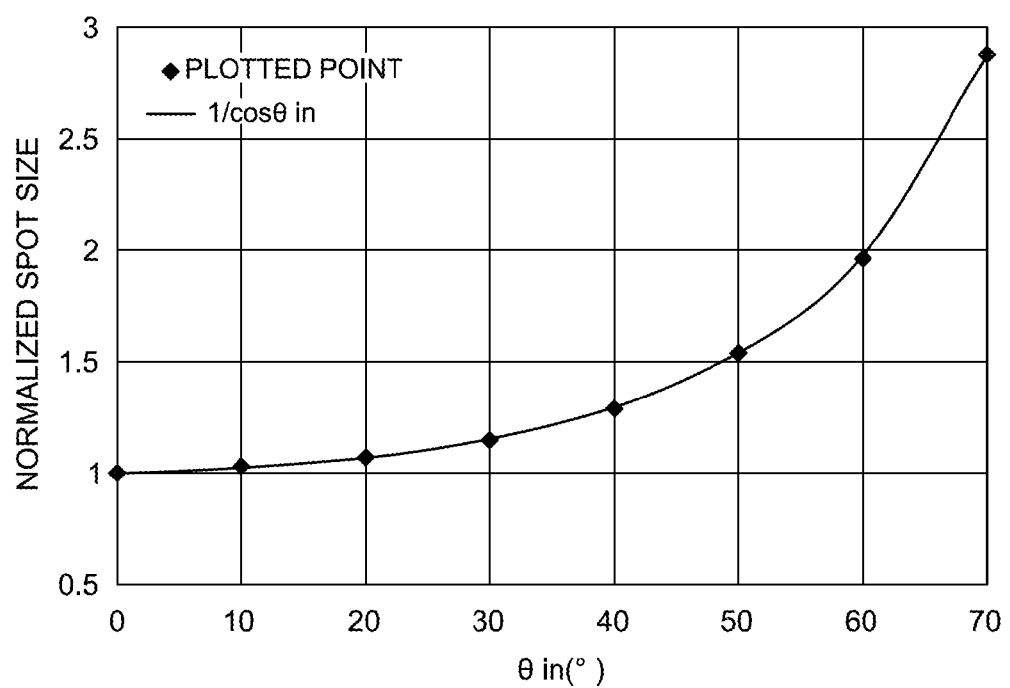

FIG. 10 is a graph showing a relationship between an incident angle and a spot size when an incident angle of a beam entering the screen is changed.

Figure 11:
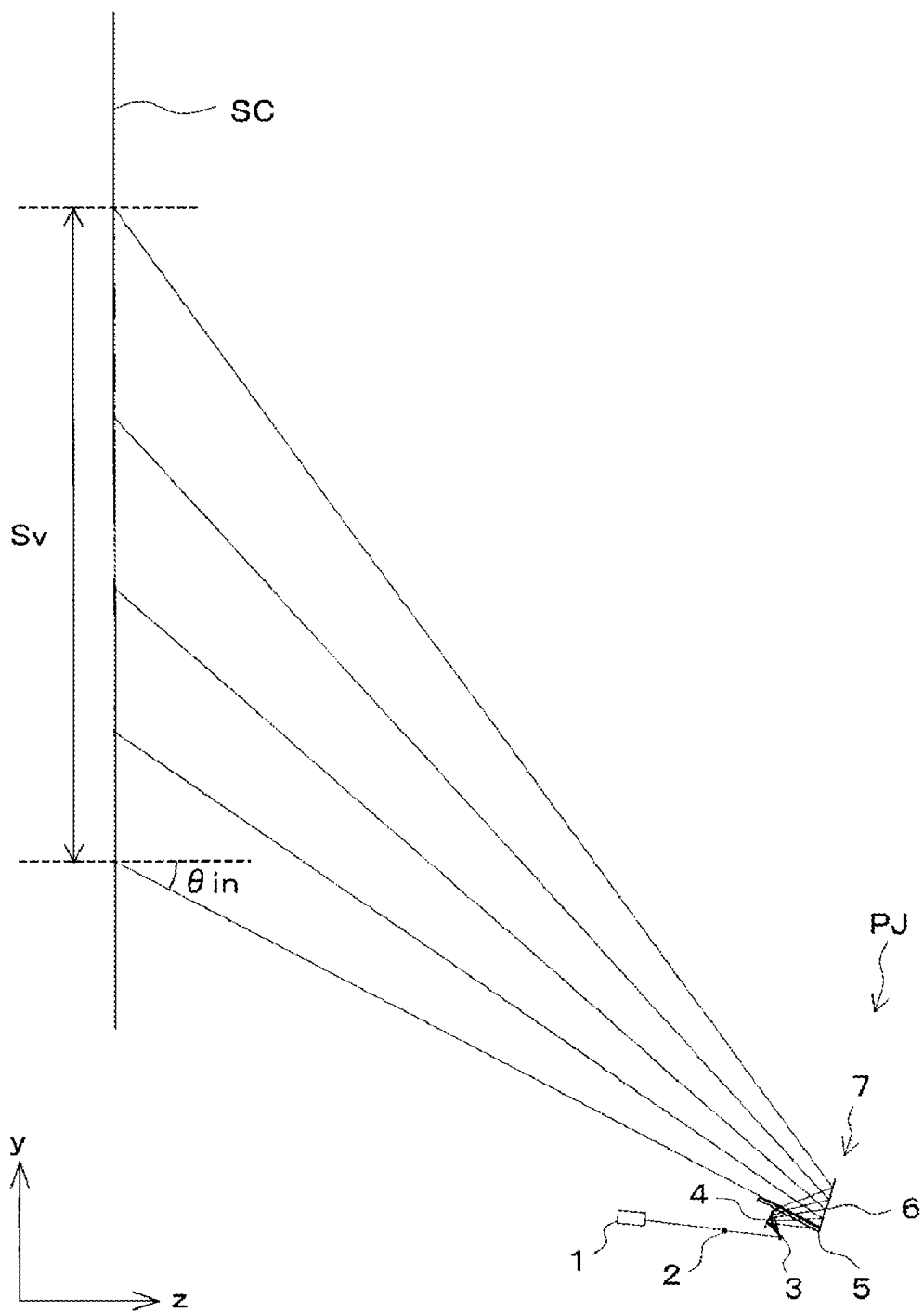

FIG. 11 is a vertical sectional view of the scanning projection device, illustrating the incident angle to the screen and the length of the image area in the short-side direction.

Figure 12:
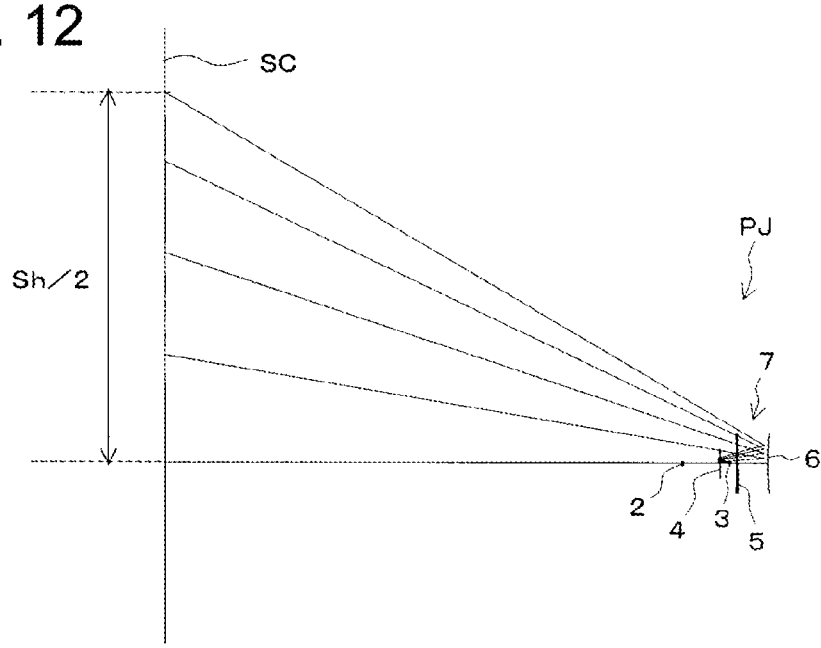

FIG. 12 is a horizontal sectional view of the scanning projection device, illustrating the half length of the image area in the long-side direction.

Figure 13:
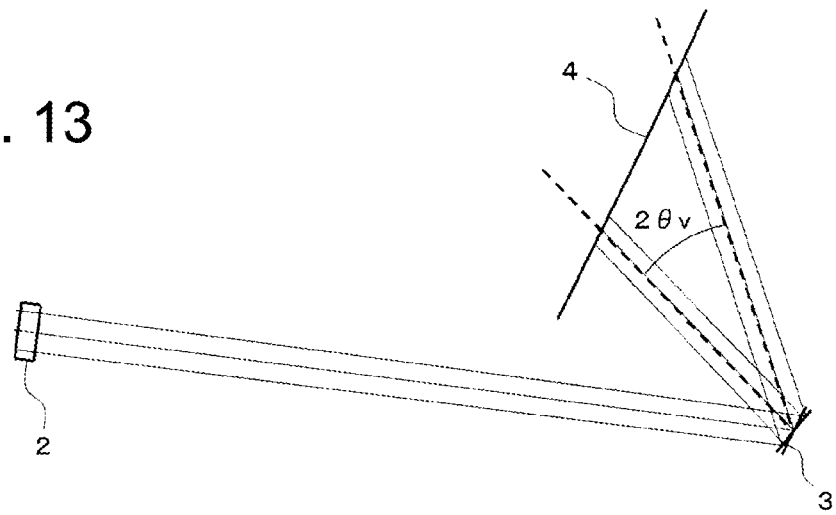

FIG. 13 is a vertical sectional view showing the surroundings of the deflection element of the above scanning projection system device.

Figure 14:
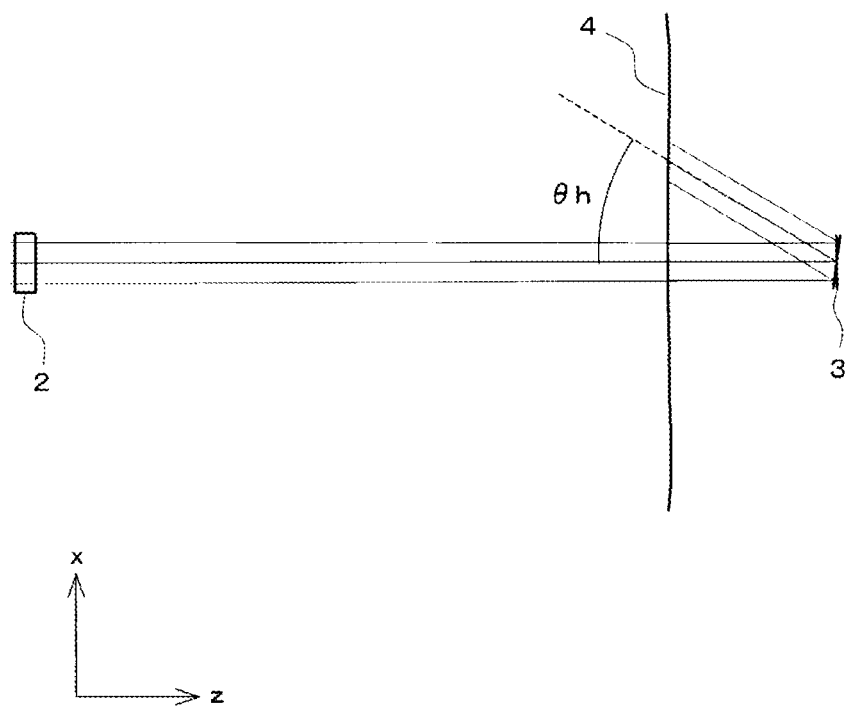

FIG. 14 is a horizontal sectional views showing the surroundings of the deflection element of the above scanning projection system device.

Figure 15:
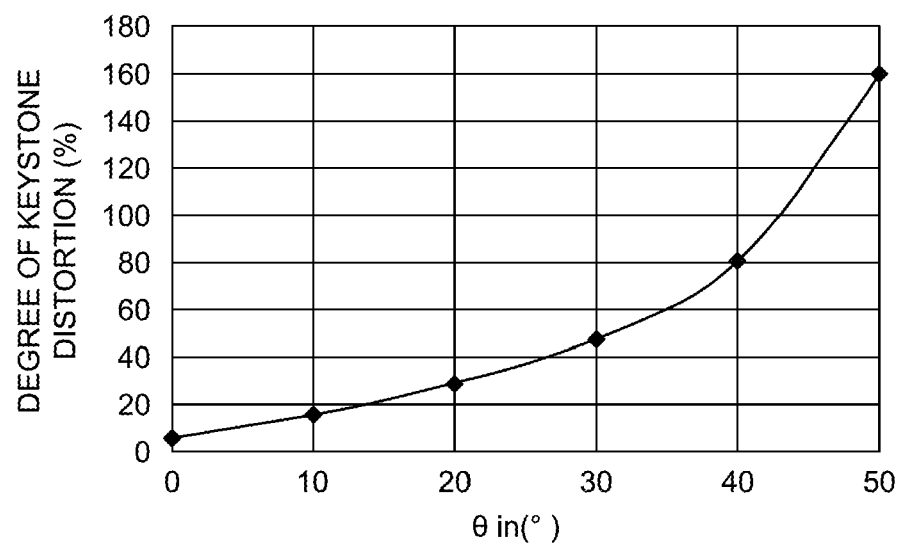

FIG. 15 is a diagram showing a change in keystone distortion caused when an incident angle of a beam entering the screen is changed.

Figure 16:
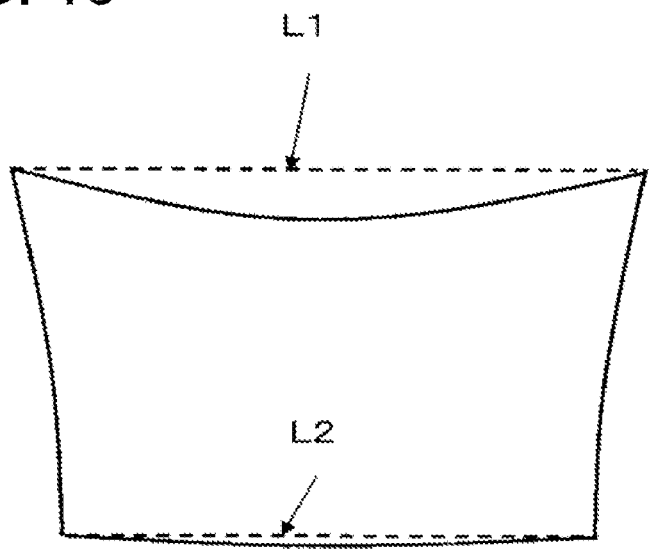

FIG. 16 is a diagram showing the keystone distortion.

Figure 17:
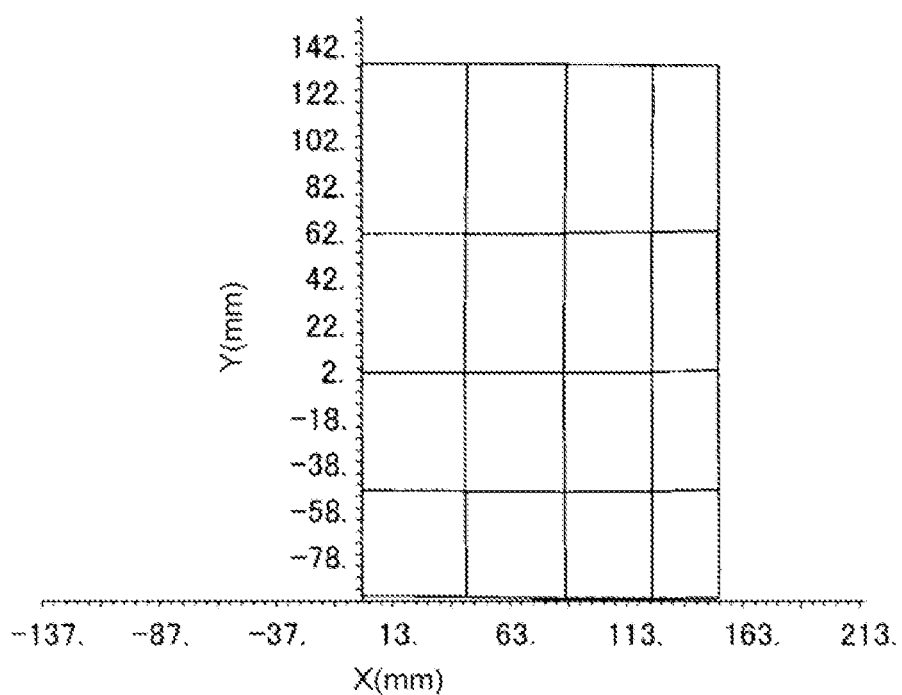

FIG. 17 is a diagram showing distortion of a two-dimensionally projected image in Example 1.

Figure 18:
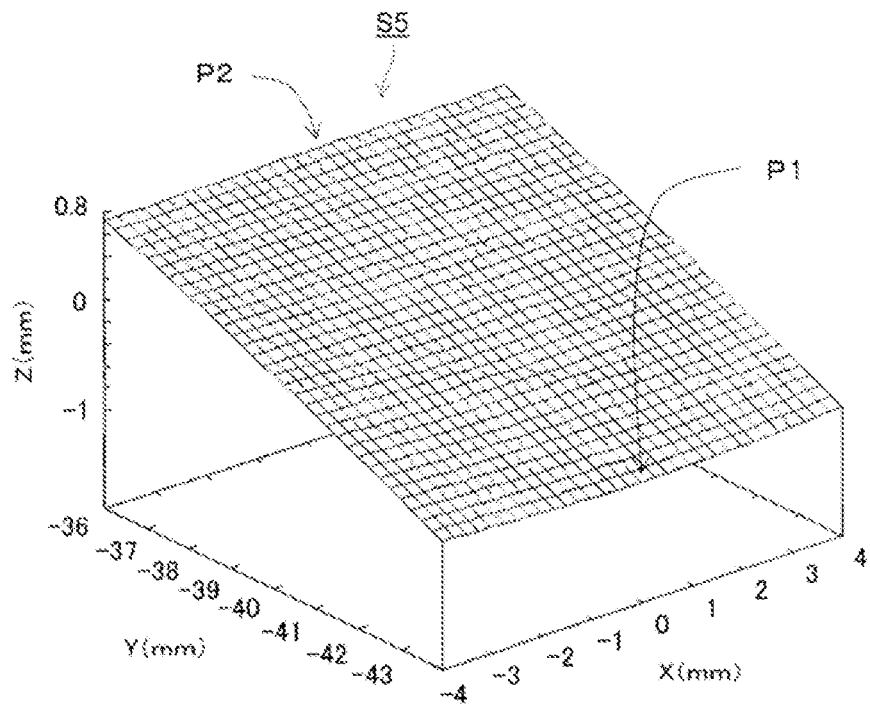

FIG. 18 is a diagram showing a surface shape of the surface S5 in Example 1.

Figure 19:
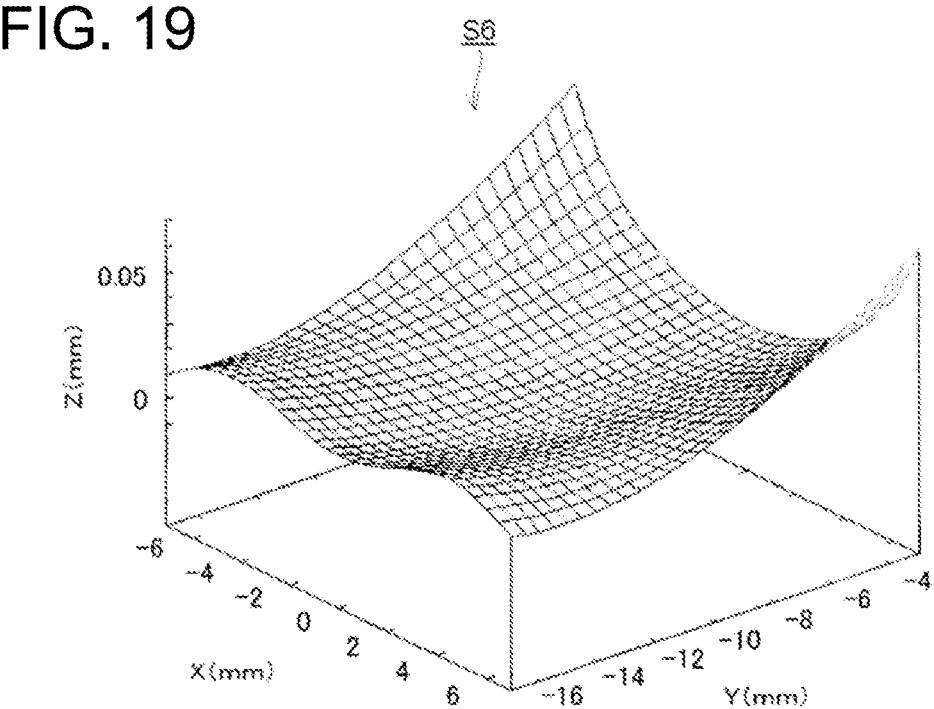

FIG. 19 is a diagram showing a surface shape of the surface S6 in Example 1.

Figure 20:
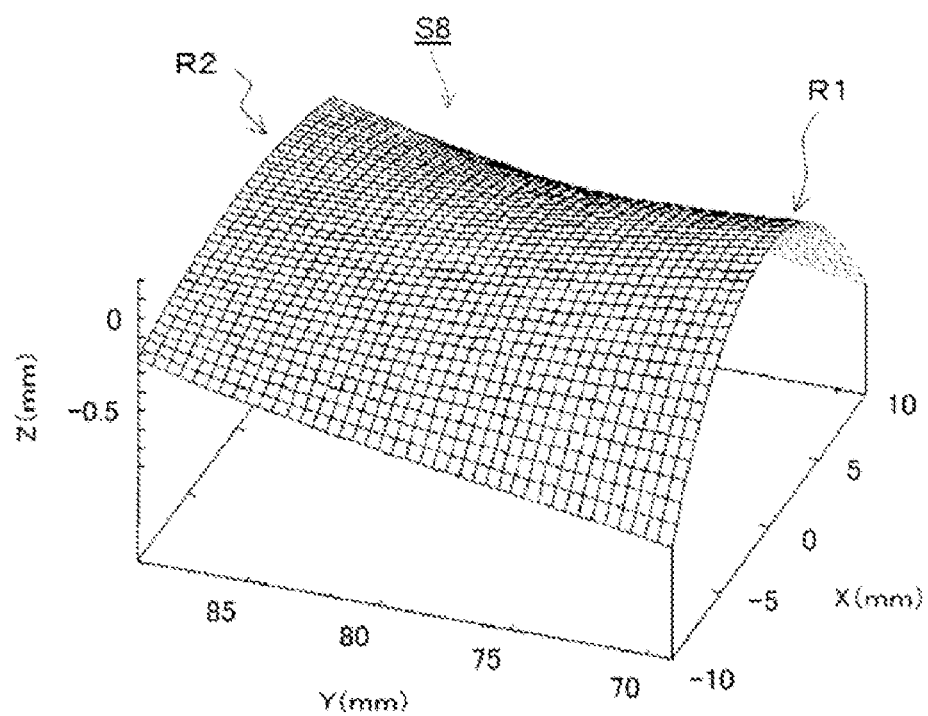

FIG. 20 is a diagram showing a surface shape of the surface S8 in Example 1.

Figure 21:
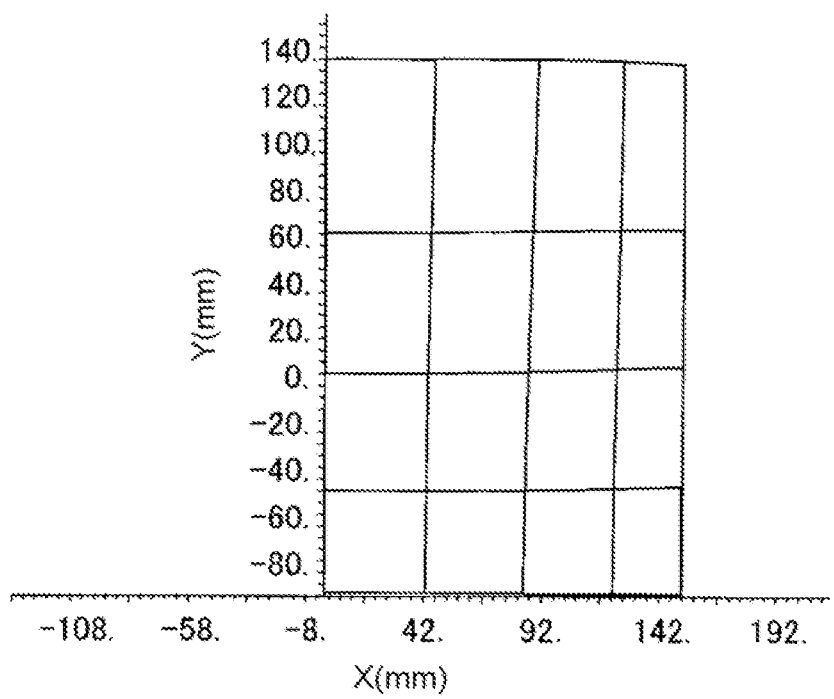

FIG. 21 is a diagram showing distortion of the two-dimensionally projected images in Example 2.

Figure 22:
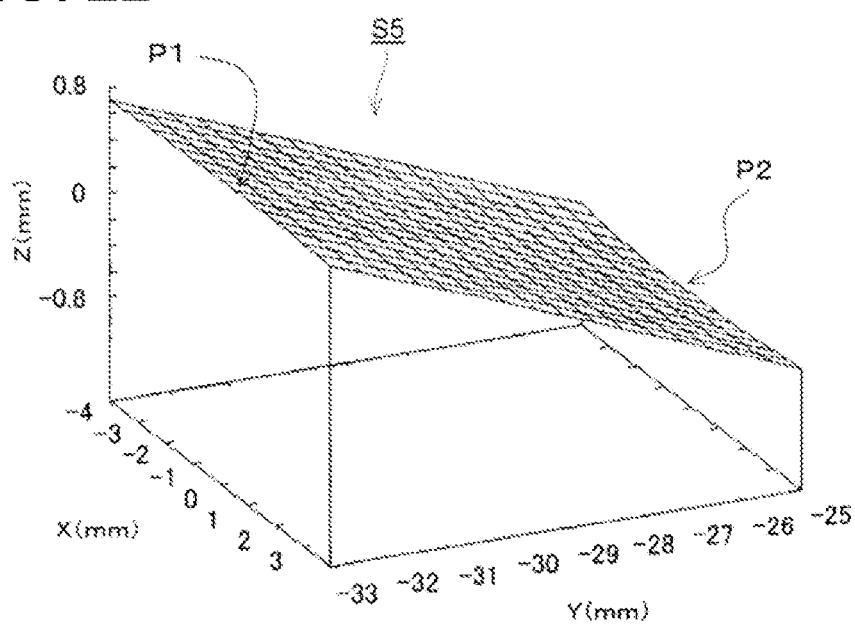

FIG. 22 is a diagram showing a surface shape of the surface S5 in Example 2.

Figure 23:
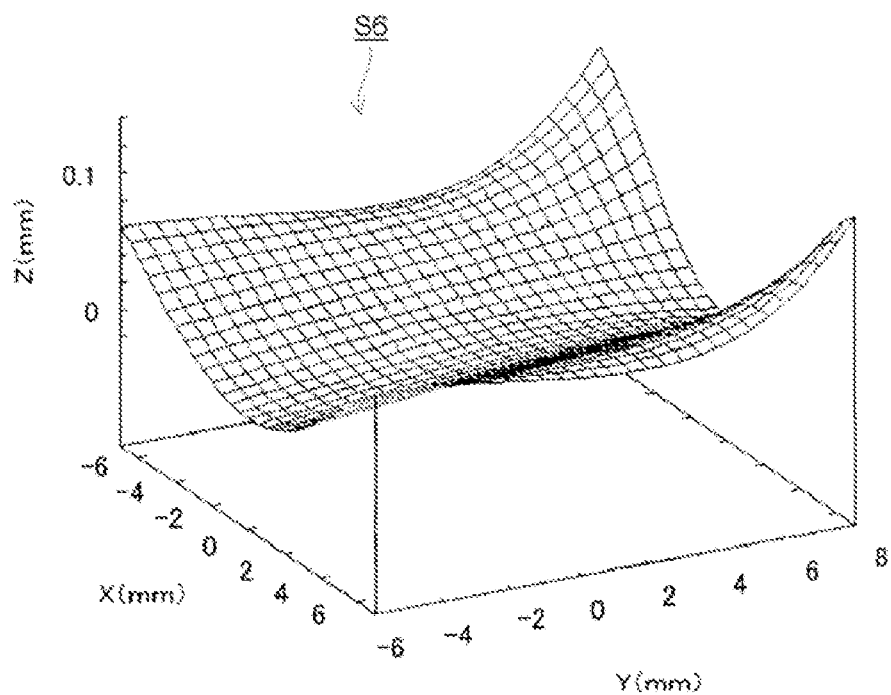

FIG. 23 is a diagram showing a surface shape of the surface S6 in Example 2.

Figure 24:
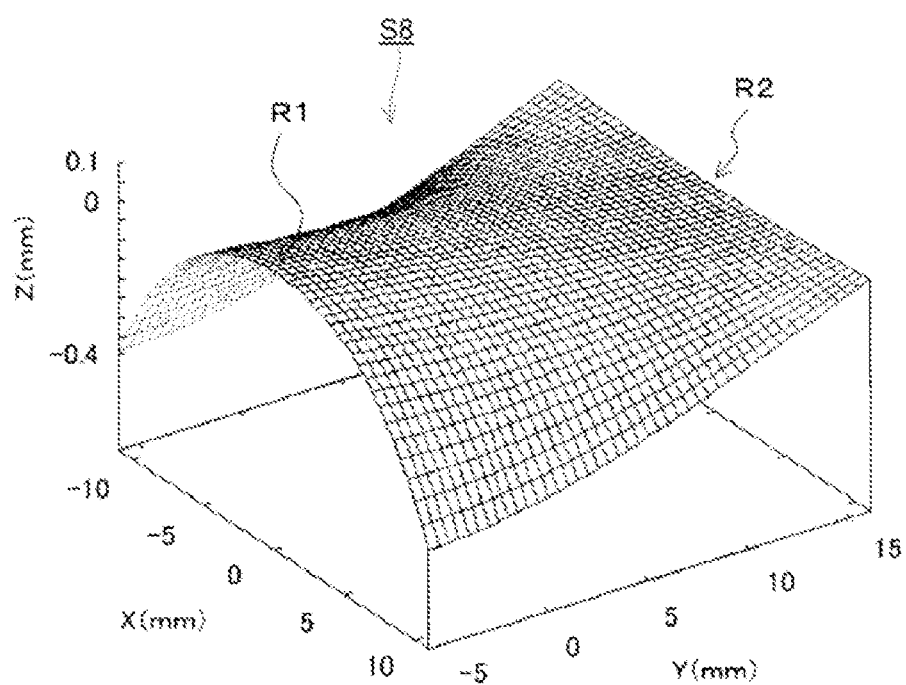

FIG. 24 is a diagram showing a surface shape of the surface S8 in Example 2.

Figure 25:
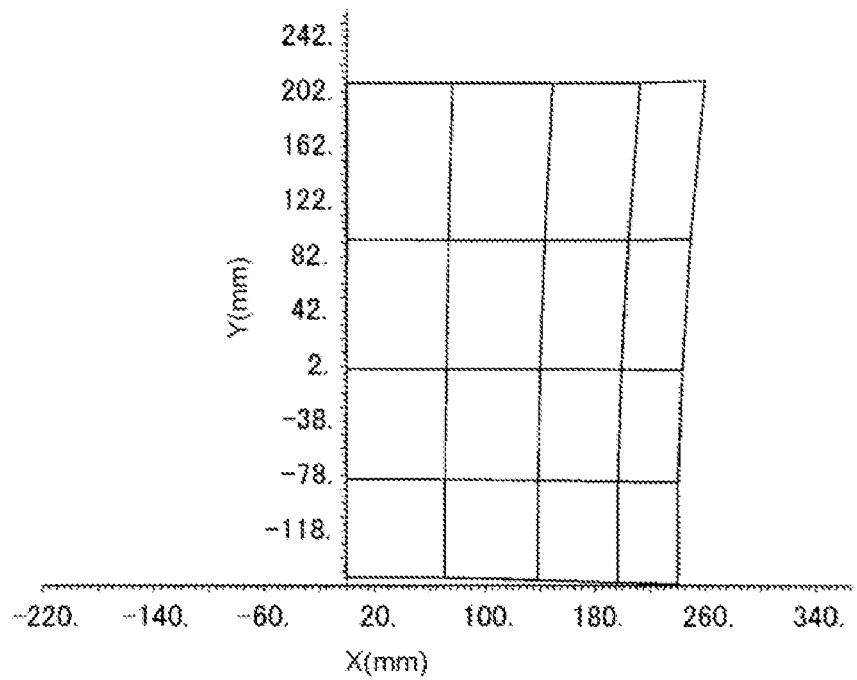

FIG. 25 is a diagram showing distortion of the two-dimensionally projected images in Example 3.

Figure 26:
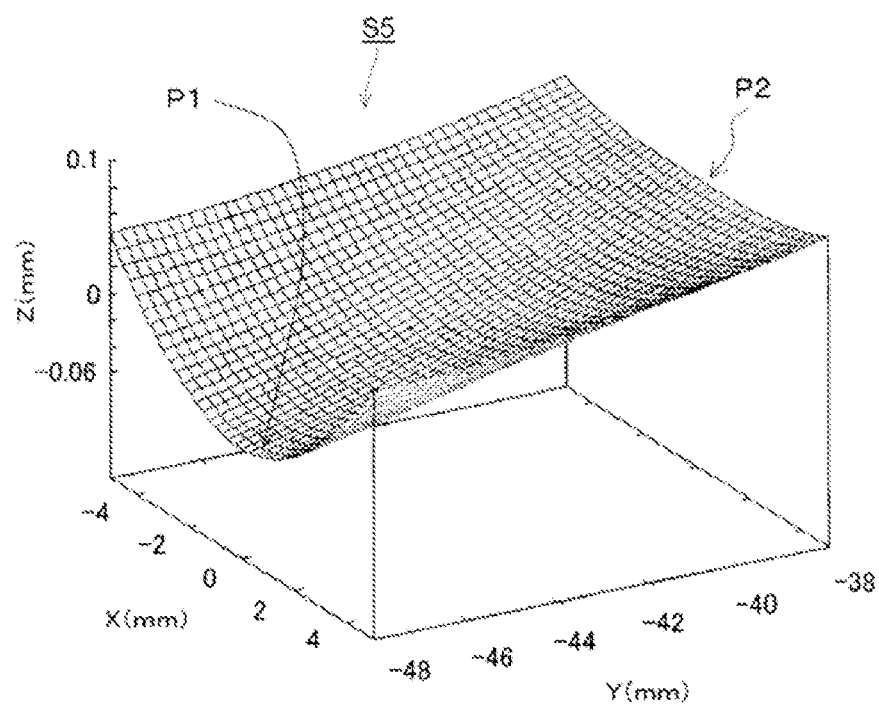

FIG. 26 is a diagram showing a surface shape of the surface S5 in Example 3.

Figure 27:
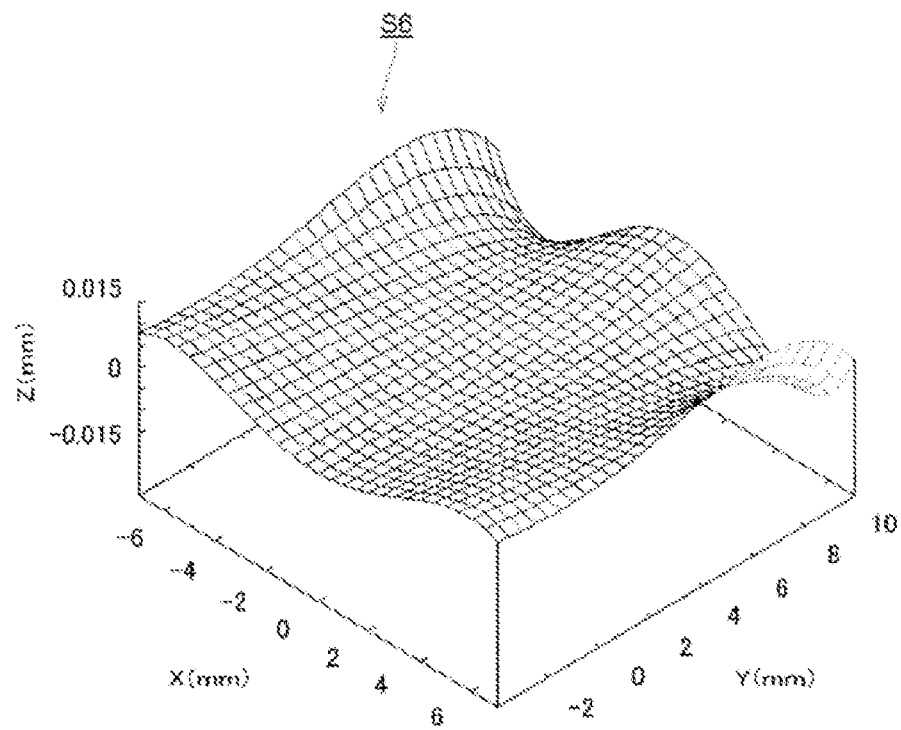

FIG. 27 is a diagram showing a surface shape of the surface S6 in Example 3.

Figure 28:
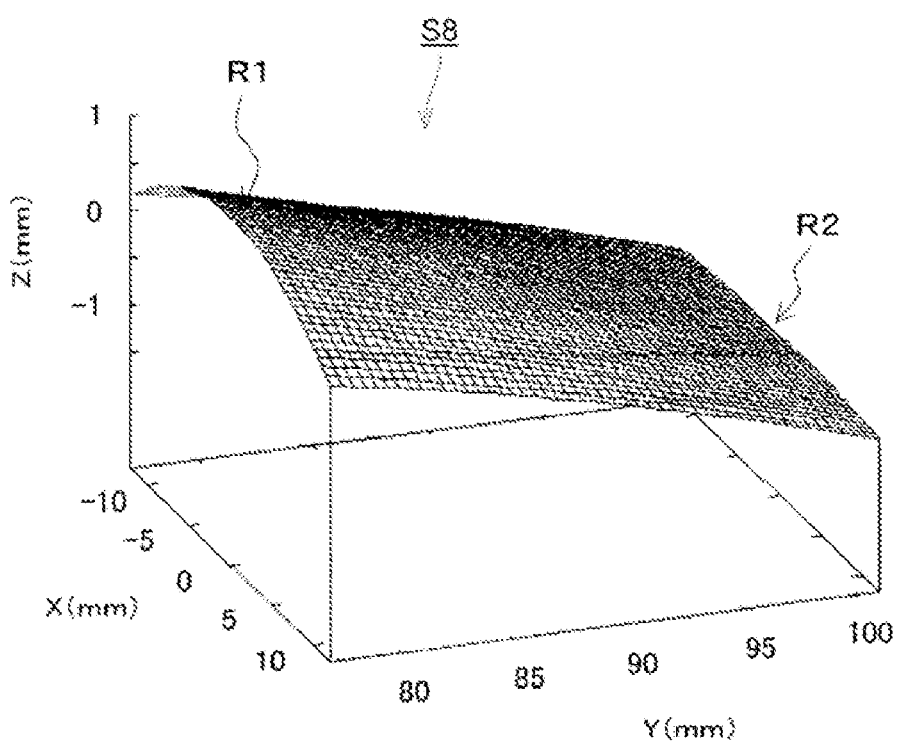

FIG. 28 is a diagram showing a surface shape of the surface S8 in Example 3.

Figure 29:
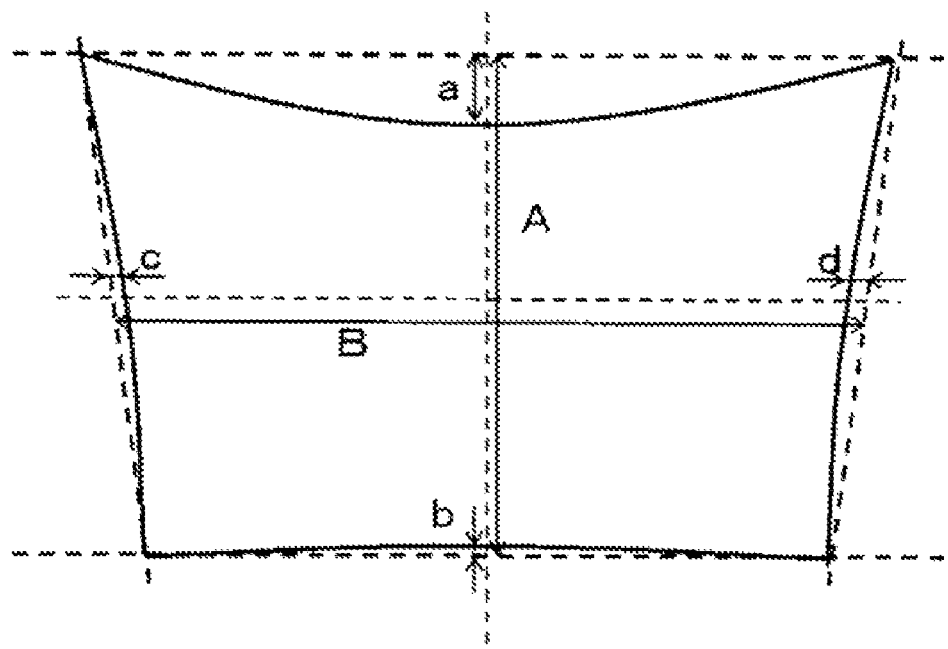

FIG. 29 is a diagram showing TV distortion.

Figure 30:
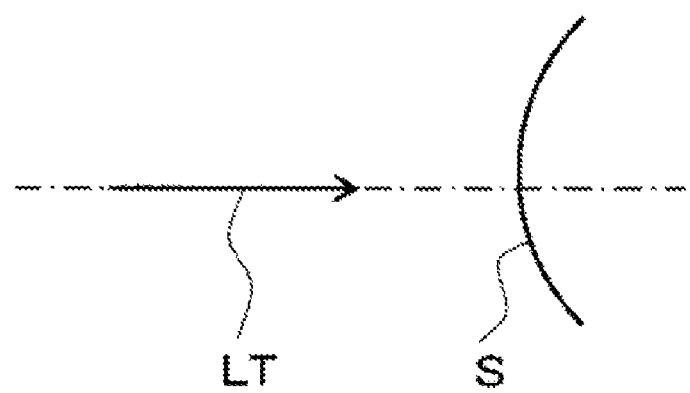

FIG. 30 is a diagram for illustrating the definition of curvature.

REFERENCE SIGNS LIST

1 Light source unit (Light source means)
2 Incident optical system
3 Deflection element (Deflection member)
4 First reflection mirror (Reflection surface, First reflection surface)
5 Refractive lens
6 Second reflection mirror (Reflection surface, Second reflection surface)
7 Projection optical system
PJ Scanning projection device
SC Screen (Scan surface)
R1 First area
R2 Second area
P1 Intersection point
P2 Intersection point

BEST MODE FOR CARRYING OUT THE INVENTION

Embodiments of the present invention will be described below, referring to the drawings.

(1. The Whole Structure of a Scanning Projection Device)

Figure 1:
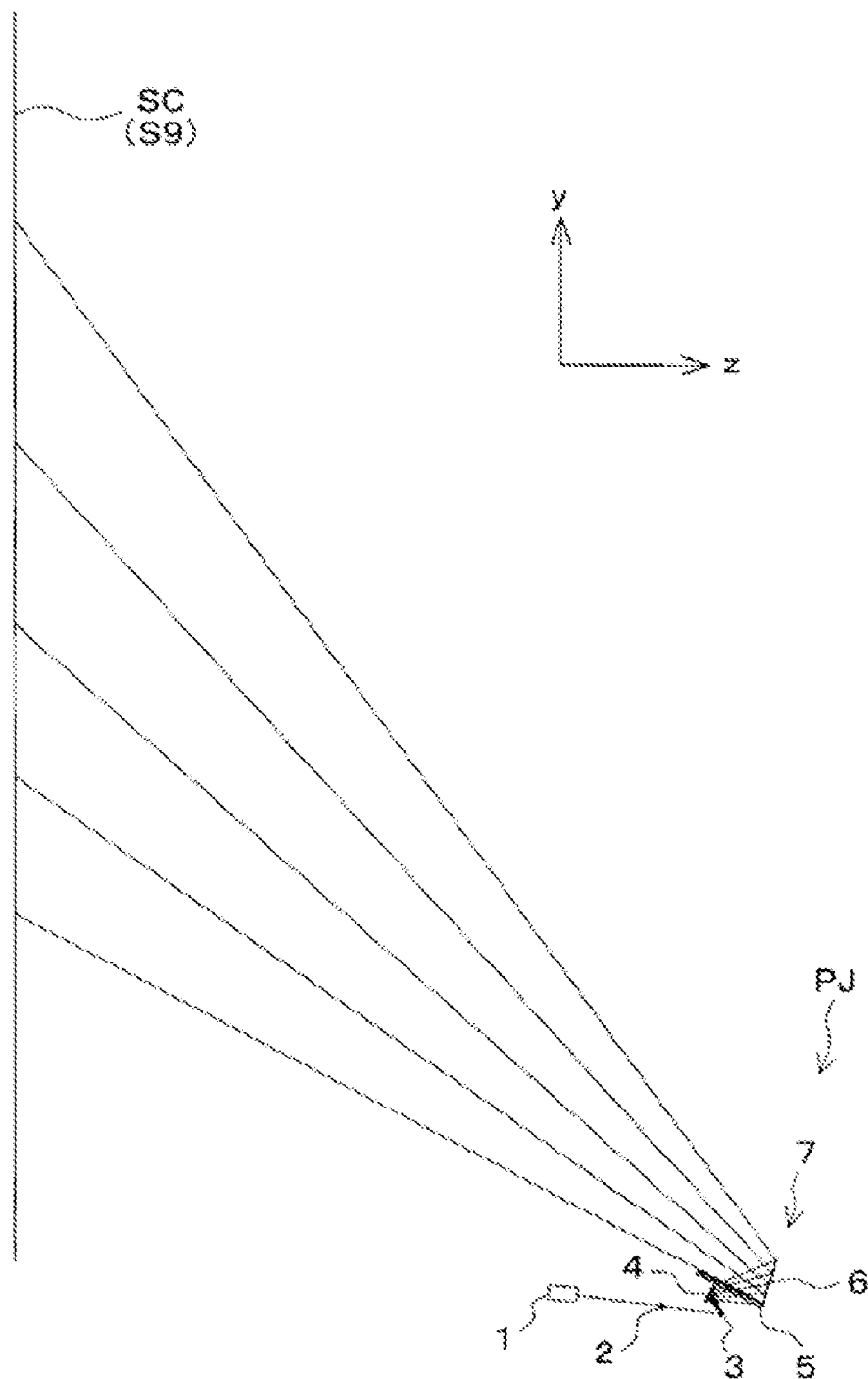
FIG. 1 is a vertical sectional view schematically showing the whole structure of a scanning projection device relating to the first embodiment of the present invention.
Figure 2:
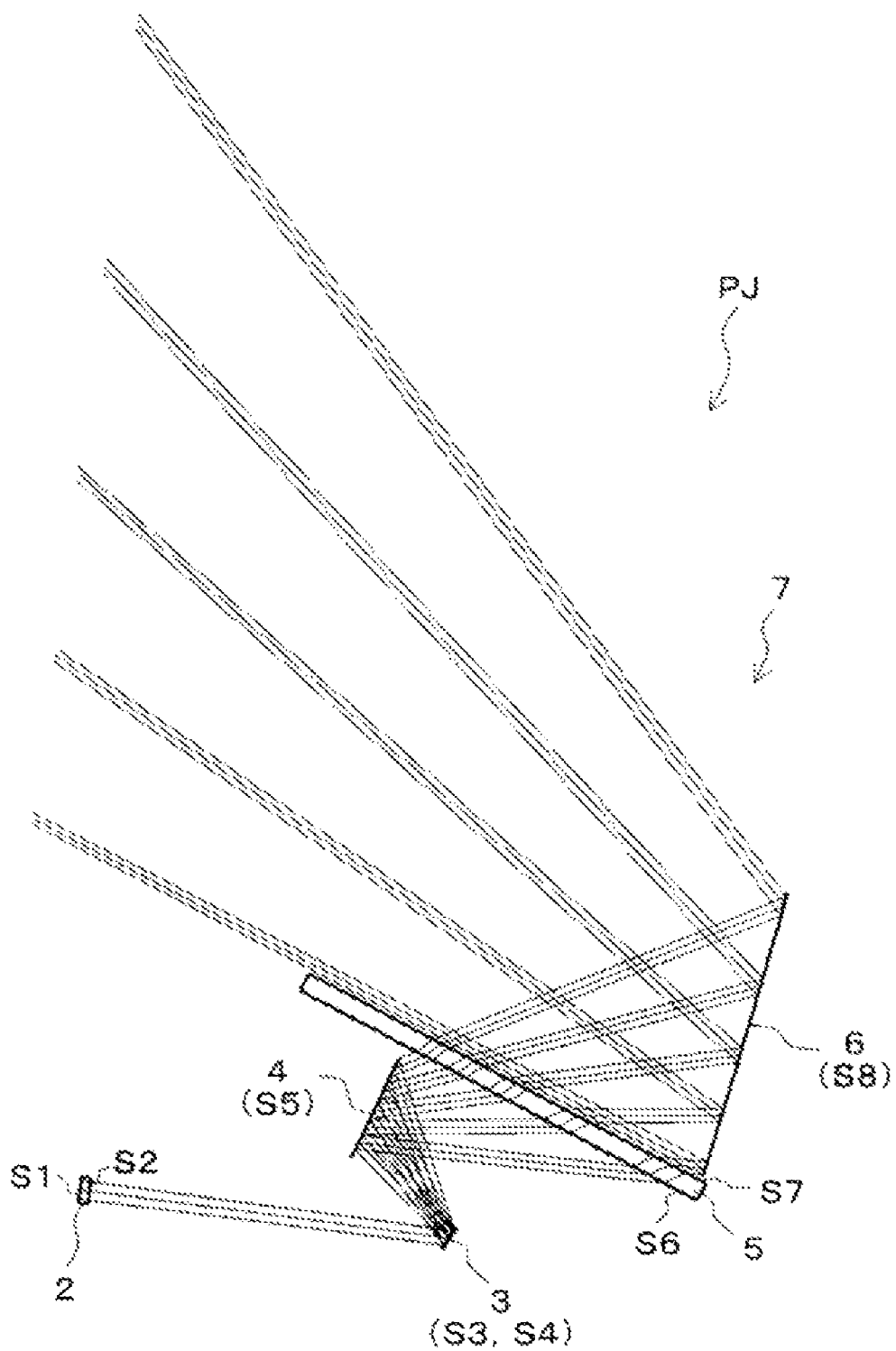
FIG. 2 is a vertical sectional view schematically showing a structure of a principal part of the above scanning projection device.
Figure 3:
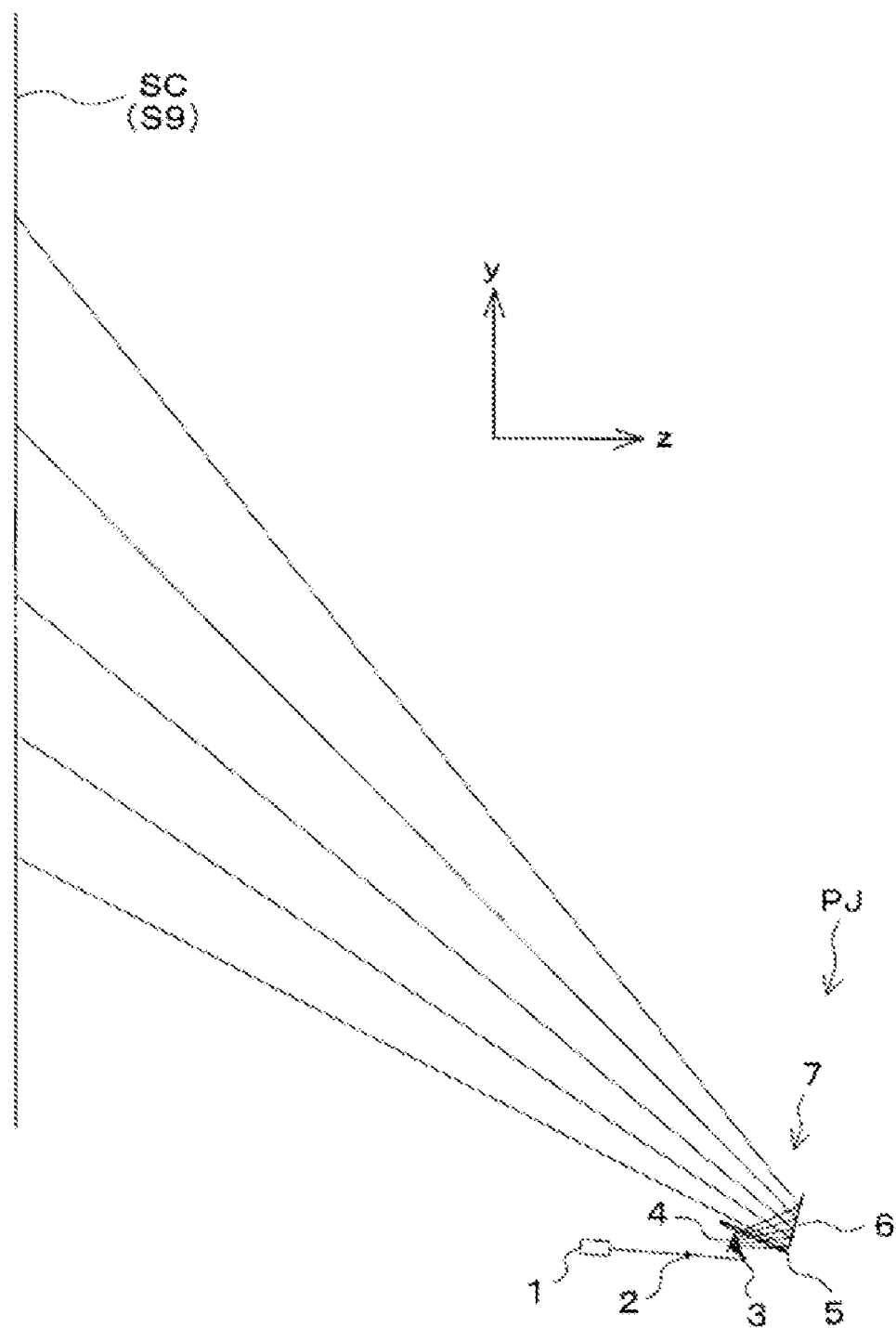
FIG. 3 is a vertical sectional view schematically showing the whole structure of a scanning projection device relating to the second embodiment of the present invention.
Figure 4:
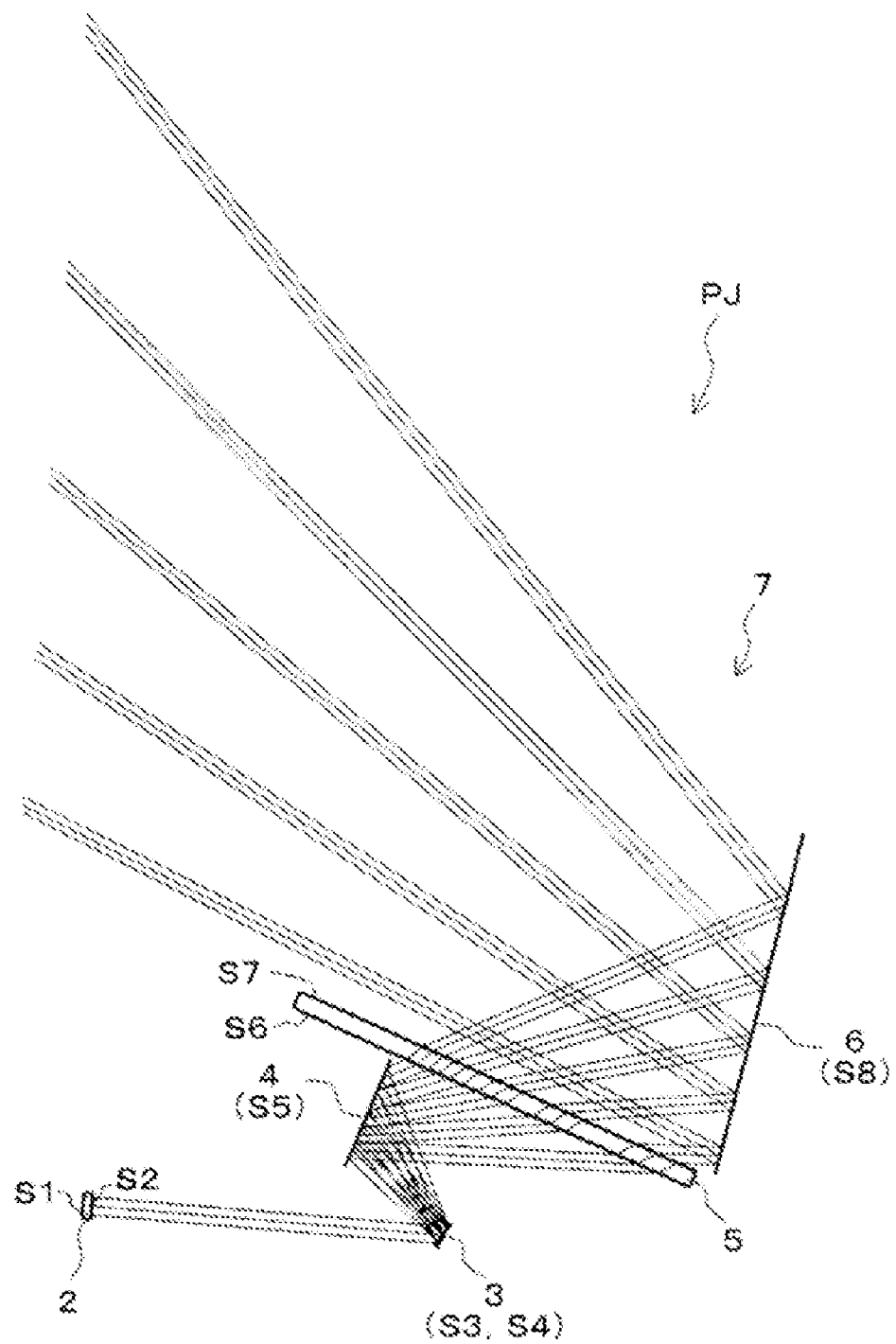
FIG. 4 is a vertical sectional views schematically showing a structure of a principal part of the above scanning projection device.
Figure 5:
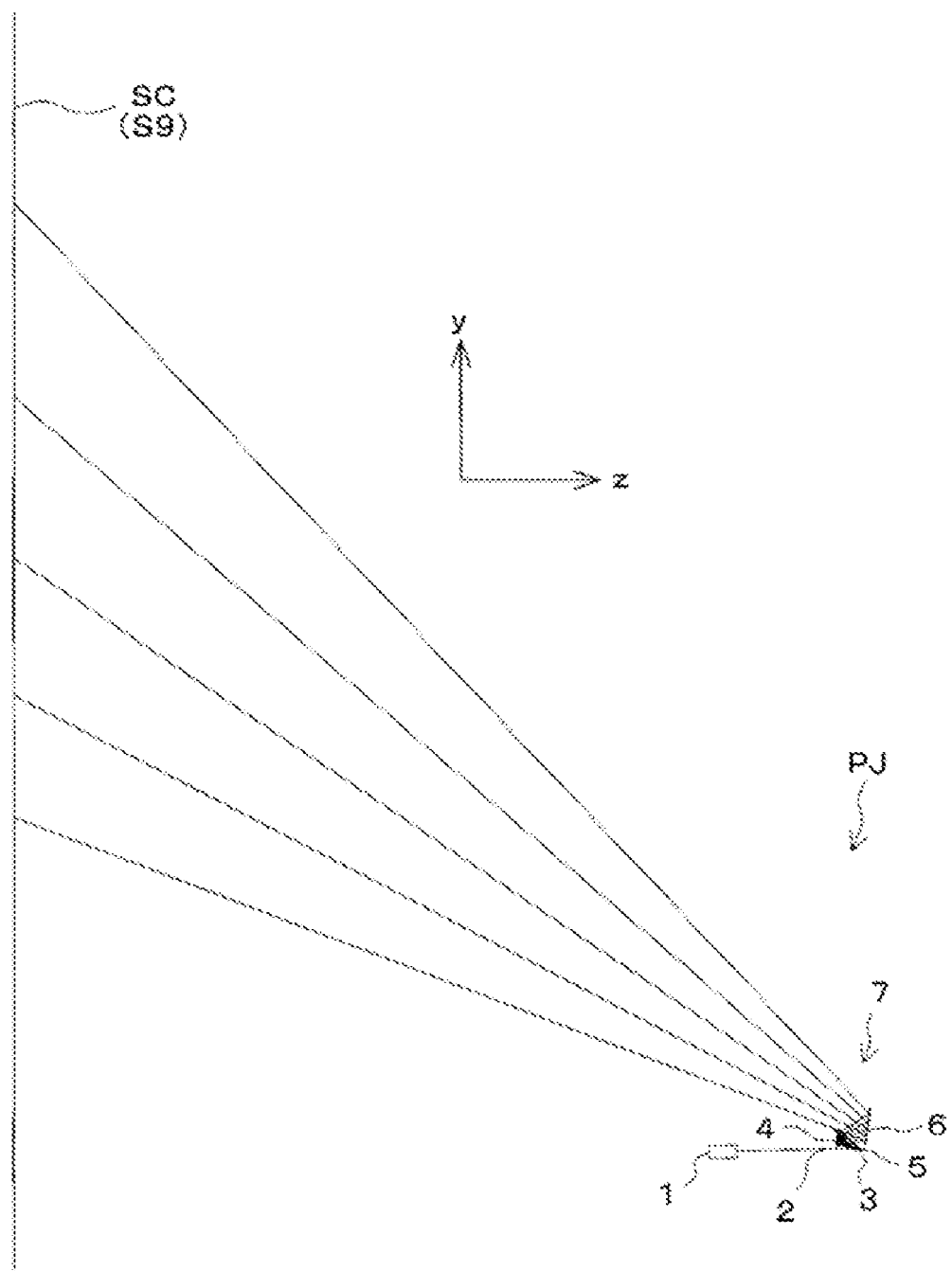
FIG. 5 is a vertical sectional view schematically showing the whole structure of a scanning projection device relating to the third embodiment of the present invention.
Figure 6:
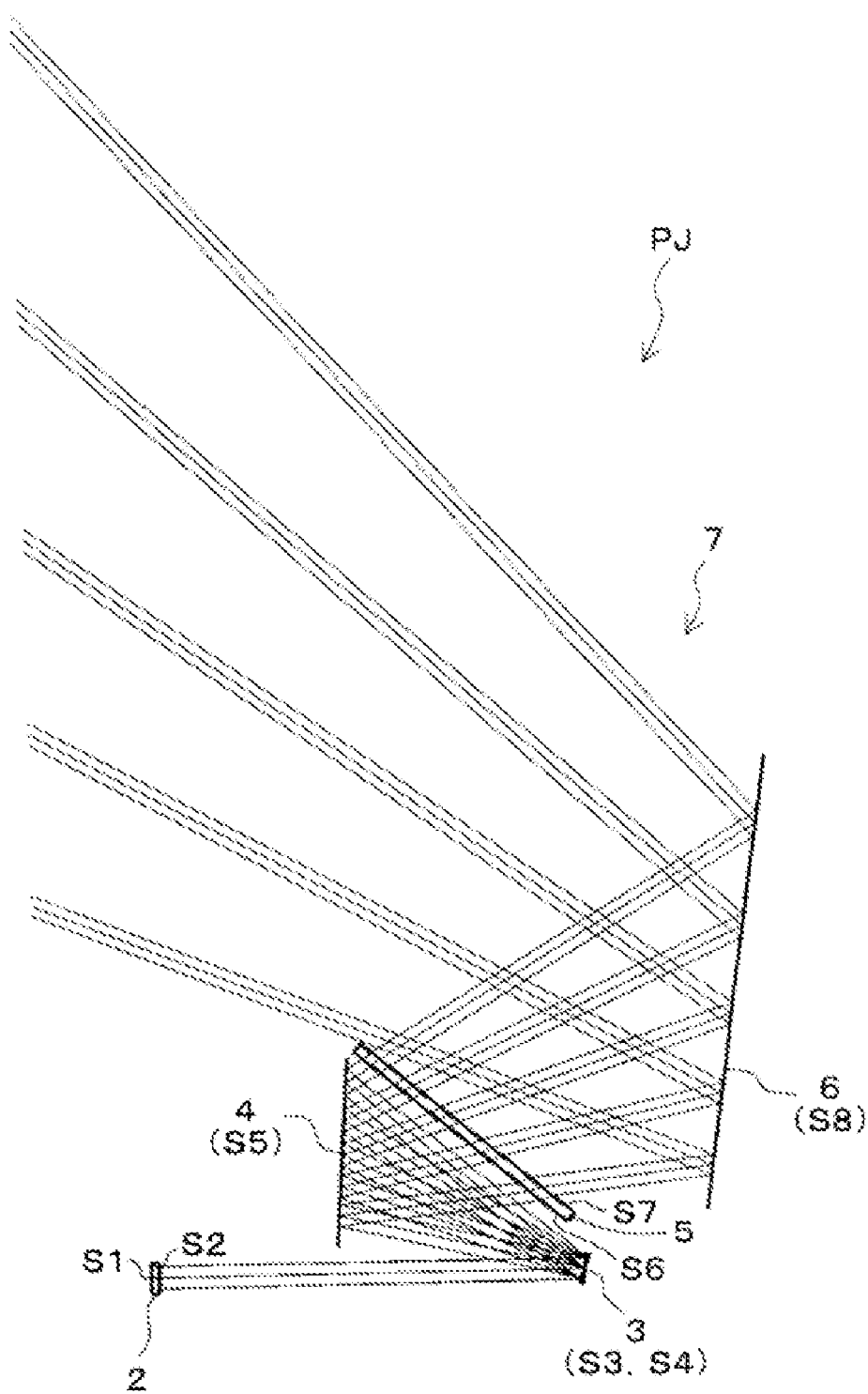
FIG. 6 is a vertical sectional views schematically showing a structure of a principal part of the above scanning projection device.

FIG. 1 is a vertical sectional view schematically showing the whole structure of scanning projection device PJ relating to the first embodiment. FIG. 2 is a vertical sectional view schematically showing a structure of a principal part of the above scanning projection device PJ of FIG. 1. FIG. 3 is a vertical sectional view schematically showing the whole structure of scanning projection device PJ relating to the second embodiment. FIG. 4 is a vertical sectional views schematically showing a structure of a principal part of the above scanning projection device PJ of FIG. 3. FIG. 5 is a vertical sectional view schematically showing the whole structure of a scanning projection device PJ relating to the third embodiment. FIG. 6 is a vertical sectional views schematically showing a structure of a principal part of the above scanning projection device PJ of FIG. 5.

In these embodiments, a short-side direction of an image area displayed on screen SC which is a scan surface, is defined as the vertical direction, and a long-side direction of the image area is defined as the horizontal direction. On the screen SC, the short-side direction of the image area is defined as the y-direction, the long-side direction of the image area is defined as the x-direction, and a direction perpendicular to the image area is defined as the z-direction. The short-side direction of the image area is identical with the first scanning direction performed by deflection element 3 which will be described later. The long-side direction of the image area is identical with the second scanning direction performed by the deflection element 3. Therefore, the first scanning direction and the second scanning direction are perpendicular to each other.

Scanning projection device PJ in each of the first through third embodiments is provided with light source unit 1, incident optical system 2, deflection element 3, and projection optical system 7.

Light source unit 1 is a light source means which includes light sources emitting laser beams in three colors of RGB, and a color synthesizing means. Each of the light sources emitting R-light and B-light is composed of a semiconductor laser, and the light source emitting G-light is composed of a diode-pumped solid-state laser. The center wavelengths of the laser beams in RGB are, for example, 630 nm (R-light), 532 nm (G-light), and 445 nm (B-light), respectively. The color synthesizing means is adopted to combine optical paths of laser beams in RGB and output the resulting beam. The color synthesizing means is composed of, for example, an element such as a dichroic prism and a dichroic mirror.

Incident optical system 2 is a light-converging optical system which guides a beam emitted from light source unit 1 to deflection element 3, and includes a lens with an anamorphic surface at the light-entering side and a flat surface at the light-outgoing side. That is, the above lens is an anamorphic lens with different curvature radiuses in the vertical direction and the horizontal direction. Therefore, when a beam emitted from light source unit 1 passes through incident optical system 2, the resulting beam enters deflection element 3 as a convergent beam in the horizontal direction and as a substantial parallel beam in the vertical direction. Employing the anamorphic lens for incident optical system 2, enables a beam with different light-flux diameters (light-flux widths) in the vertical direction and the horizontal direction to enter deflection element 3.

Deflection element 3 is a two-dimensional deflection member which deflects a beam emitted from light source unit 1 and entering deflection element 3 through incident optical system 2, in the horizontal direction and the vertical direction. Deflection element 3 is composed, for example, of a MEMS mirror. Details of deflection element 3 will be described later. For deflection element 3, a sinusoidal drive (high-speed resonance drive) is horizontally performed, and a linear drive (low-speed drive) is vertically performed.

As deflection element 3, it is preferable to employ an element capable of realizing a horizontal drive and a vertical drive simultaneously despite its structure constituted of a single element. By employing such the deflection element 3, the number of elements in the scanning means can be reduced and the cost can also be reduced. Further, time and effort spent for alignment can also be reduced significantly. Further, deflection element 3 which two-dimensionally deflects incident light is smaller in size, than an optical modulation element (such as LCD and DMD) including a two-dimensional image display area, which allows projection optical system 7 arranged behind deflection element 3 to have a downsized structure. Therefore, by employing such the deflection element 3, the whole device can be downsized.

Projection optical system 7 is an optical system which guides a beam deflected by deflection element 3 to screen SC, and includes reflection mirror 4 (first reflection surface), refractive lens 5, and second reflection mirror 6 (second reflection surface).

First reflection mirror 4 is adopted to reflect a beam deflected by deflection element 3 and to guide the reflected beam to refractive lens 5, and is composed of a mirror in a shape of a XY free-form surface with rotational asymmetry.

Refractive lens 5 is adopted to refract the beam reflected by first refection mirror 4 and to guide the refracted beam to second reflection mirror 6. Refractive lens 5 is composed of a lens including a XY free-form surface with rotational asymmetry at the light-entering side and a flat surface at the light-outgoing side. By arranging refractive lens 5 at a position between first reflection mirror 4 and second reflection mirror 6, it makes the structure of the device compact.

Second reflection mirror 6 is adopted to reflect the beam which travels from first reflection mirror 4 and enters second reflection mirror 6 through refractive lens 5, and to guide the beam to screen SC. Second reflection mirror is composed of a mirror in a shape of a XY free-form surface with rotational asymmetry.

According to the above structure, when image signal is inputted from an image inputting device (which is not illustrated) into scanning projection device PJ, an deflection angle of the mirror in deflection element 3 and outputs of respective laser beams in RGB are calculated by an image processing circuit (which is not illustrated). Then, based on the instruction of the image processing circuit, deflection element 3 is driven and outputs (brightness, and light amount) of laser beams in RGB in light source unit 1 are modulated with corresponding to the drive of deflection element 3.

A beam emitted from light source unit 1 passes through incident optical system 2 and enters deflection element 3. Then, the beam is deflected in the horizontal direction and the vertical direction. The beam deflected by deflection element 3, sequentially passes first reflection mirror 4, refractive lens 5, and second reflection mirror 6, and is projected to screen SC. Therefore, the beam is deflected two-dimensionally by the above two-dimensional drive of deflection element 3 while the above-described outputs of the beam are modulated, and screen SC is two-dimensionally scanned with the beam, which enables an image to be displayed two-dimensionally on screen SC.

When the maximum outputs of the laser beams in RGB are defined to 150 mW, 120 mW, and 83 mW, respectively, an extremely bright image in which white is beautiful and color-reproducing region is broad, can be obtained. Here, the output value of light source unit 1 is about 100 lumens in this case. When the total sum of loss caused by the optical system (such as loss coming from surface reflection, loss coming from time control of MEMS, and loss coming from the color synthesizing means) is assumed to be 50%, there can be realized scanning projection device PJ exhibiting a brightness of 50 lumens.

The modulation method of the laser beam in G can be a direct modulation of a pumping laser (which includes a method to generate a second harmonics with a PPLN (Periodically Poled Lithium Niobate) waveguide), or can be an external modulation of an element such as an acousto-optic element (AO element). However, the former method is preferable in the viewpoint that an AO element is needless.

Incidentally, in the first through third embodiments, in order to display a color image on screen SC, beams from three light sources in RGB are synthesized, and the resulting beam is projected through projecting optical system 7 onto screen SC. When chromatic aberrations (magnification chromatic aberration and longitudinal chromatic aberration) are caused at that time, it causes color bleeding to deteriorate a quality of the image. Therefore, projection optical system 7 needs to be an optical system with suppressed chromatic aberrations. When projection optical system includes a refractive lens with large power, chromatic aberrations are caused so as to be hardly corrected. Therefore, projection optical system 7 is preferably provided with a reflection optical system which does not cause chromatic aberrations or with refractive lenses with small powers which cause small chromatic aberrations.

When projection optical system is composed of a reflection optical system, deflection element 3 needs to be arranged such that an incident ray and a reflected ray can be separated, where the rays are preferably separated in the vertical direction in projection optical system 7. One reason is that common display areas are mostly provided as areas elongated in the horizontal direction with the aspect ratio such as 4:3 and 16:9, and that the rays are easily separated in the direction along the short side of the image area, which downsizes the whole device. Another reason is that a general projection device such as a projector, projects a beam toward a projection surface such as a screen from a lower and front position of the projection surface and that the separation of the rays in the vertical direction makes the projection from a oblique and lower position easy.

In each of the first through third embodiments, a light flux enters deflection element 3 at a certain angle to the vertical direction. When a light flux enters deflection element 3 with inclining against the vertical direction, such the structure eliminates a width reduction of a light flux which is capable to be deflected due to a change in direction of the deflection surface (reflection surface) of deflection element 3. Therefore, the light-amount loss caused by the deflection can be reduced.

(2. Details of the Deflection Element)

Next, details of deflection element 3 will be described.

Figure 7:
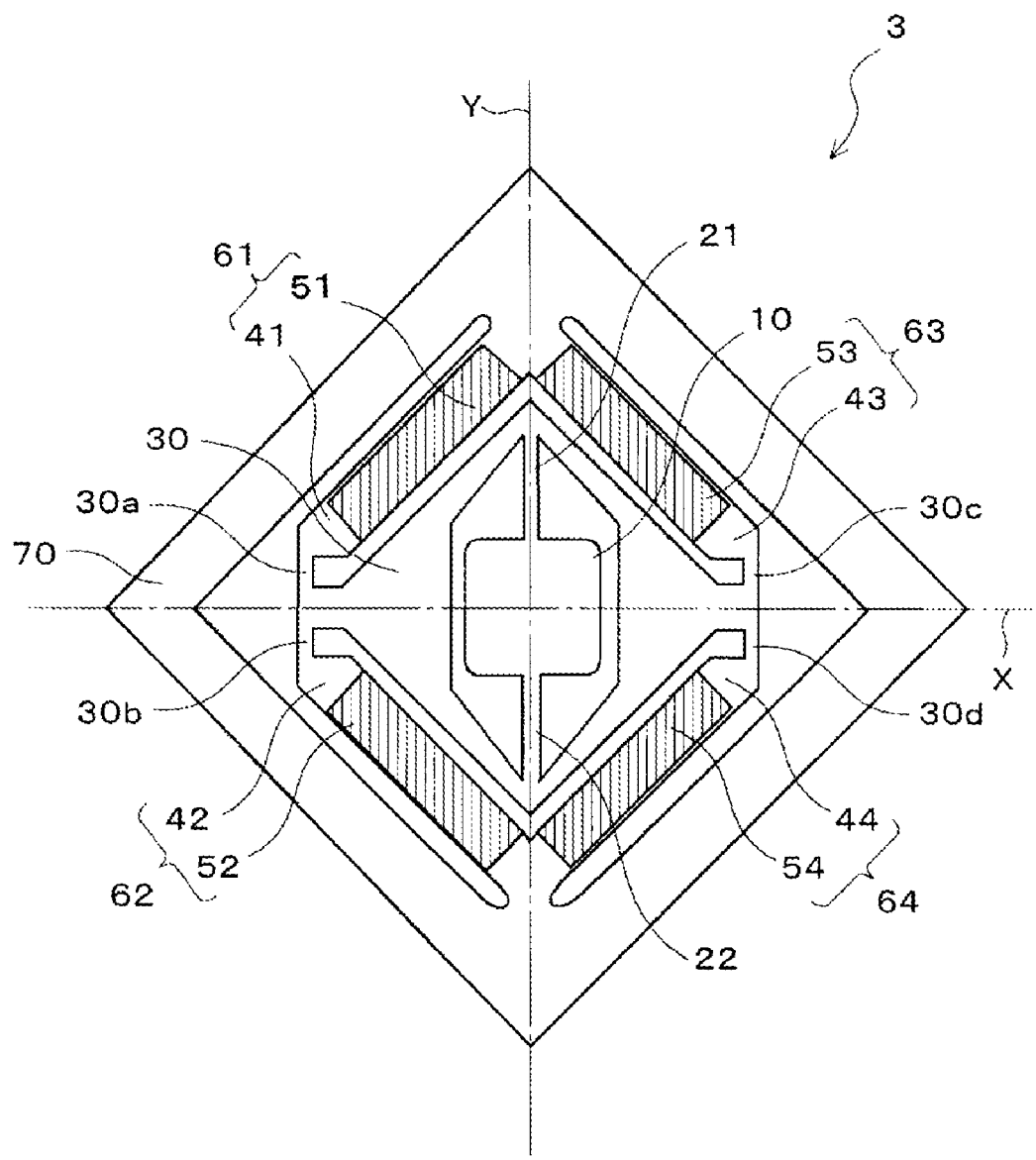
FIG. 7 is a plan view showing a skeleton structure of a deflection element used for the scanning projection devices in each of the first to third embodiments.

FIG. 7 is a plan view showing a skeleton structure of deflection element 3. Each of FIGS. 8*a* through 8*e* is a sectional view taken by cutting deflection element 3 of FIG. 7 along a cross section parallel to the Y-axis. Deflection element 3 is a MEMS mirror including mirror section 10, movable frame 30, and fixed frame 70. Fixed frame 70 is a portion for fixing deflection element 3 on a casing (which is not illustrated). Inside the fixed frame 70, movable frame 30 is formed as a movable portion to have a shape of frame. Inside the movable frame 30, mirror section 10 is formed to have a rectangular shape.

Mirror section 10 forms a reflection surface which two-dimensionally deflects a beam from light source unit 1, and is elastically supported at the opposing sides by movable frame 30 through torsion bars 21 and 22. The torsion bars 21 and 22 extend from a pair of opposing sides of mirror section 10 toward the outside along the Y-axis running through the center of mirror section 10. Movable frame 30 perpendicularly crosses with torsion bars 21 and 22, and is elastically supported at the opposing sides by fixed frame 70 through curved beams 41 to 44. Each of curved beams 41 to 44 is connected with movable frame 30 at one end positioned in portions 30a through 30d around the X-axis running through the center of mirror section 10. Mirror section 10, torsion bars 21 and 22, movable frame 30, curved beams 41 through 44, and fixed frame 70 are formed as one body with anisotropic etching on a silicone substrate.

Figure 8A:
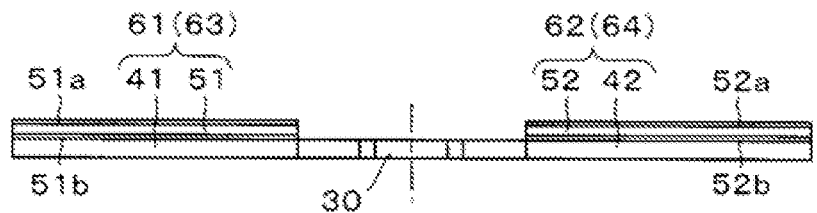

Piezoelectric elements 51 through 54 are stuck on the surfaces of curved beams 41 through 44 with adhesive to form four unimorph sections 61 through 64. As shown in FIG. 8a, upper electrode 51a and lower electrode 51b are formed on the opposing surfaces of piezoelectric element 51, respectively, and upper electrode 52a and lower electrode 52b are formed on the opposing surfaces of piezoelectric element 52, respectively. Similarly, upper electrodes and lower electrodes are formed on the opposing surfaces of piezoelectric elements 53 and 54, respectively.

For example, when alternating voltage is applied to upper electrode 51a and lower electrode 51b within the range that the voltage does not cause an inversion of dielectric polarization, piezoelectric element 51 expands and shrinks to be displaced in the thickness direction in the manner of a unimorph. Therefore, curved beams 41 to 44 applies running torque to movable frame 30 independently around the Y-axis and the X-axis, by using bending deformations of piezoelectric elements 51 to 54 caused by the voltage applied to respective electrodes. Thereby, movable frame 30 can be rotated on two axes of the Y-axis and X-axis. Details of the rotation will be described below.

Figure 8B:
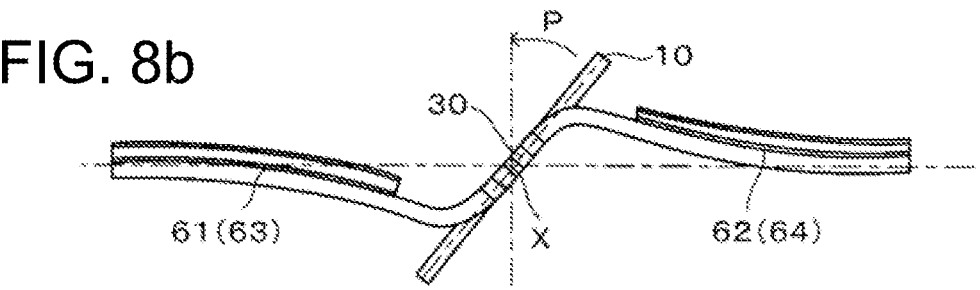

First, rotation on the X-axis will be described. Under the condition of FIG. 8a that piezoelectric elements 51 and 52 do not expand and shrink, voltage in an expanding direction is applied to piezoelectric element 51, and voltage in a shrinking direction (which is voltage with the opposite phase to the voltage applied to piezoelectric element 51) is applied to piezoelectric element 52. Because each of unimorph sections 61 and 62 is fixed on and supported by fixed frame 70 at one end, unimorph section 61 bends with the other end displaced downward, and unimorph section 62 bends with the other end displaced upward, as shown in FIG. 8b.

Figure 8C:
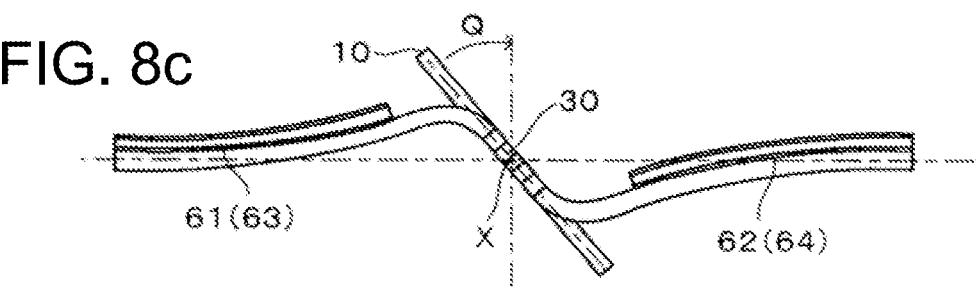

Similarly, voltage with the same phase to the voltage applied to piezoelectric elements 51 and 52, is applied to each of piezoelectric elements 53 and 54. Because each of unimorph sections 63 and 64 is fixed on and supported by fixed frame 70 at one end, unimorph section 63 bends with the other end displaced downward, and unimorph section 64 bends with the other end displaced upward. Thereby, running torque around the X-axis acts on movable frame 30, and movable frame 30 is tilted to one direction (direction P) on the X-axis. When voltage with the opposing phase to the above description is applied to piezoelectric elements 51 through 54, as shown in FIG. 8c, running torque in the opposing direction around the X-axis acts on movable frame 30, and movable frame 30 is tilted to the opposing direction (direction Q) to the above description on the X-axis, which is based on the same principal to the above.

When alternating voltage which keeps the above-descried phase relationship is applied to piezoelectric elements 51 through 54, each of unimorph sections 61 through 64 repeatedly oscillates in the vertical direction, following the alternating voltage. Then, running torque acts on movable frame 30 as a movement of a seesaw, and movable frame 30 rotationally oscillates to incline up to a predetermined displacement angle on the X-axis. Portions 30a through 30d where unimorph sections 61 to 64 are connected with movable frame 30, are narrow in width and bend more easily than another portions. Therefore, as shown in FIGS. 8b and 8c, portions around the X-axis in movable frame 30 is greatly tilted because of slight deflections in unimorph sections 61 through 64, which enables to tilt mirror section 10 largely. Alternatively, connecting portions 30a through 30d can have less thickness than another portions, rather than less width.

Figure 8D:
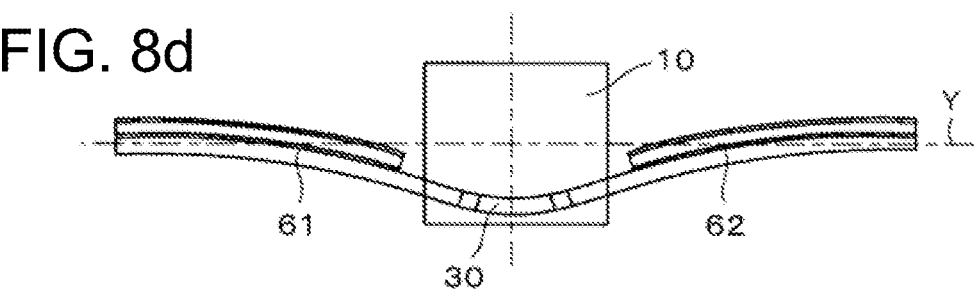
Figure 8E:
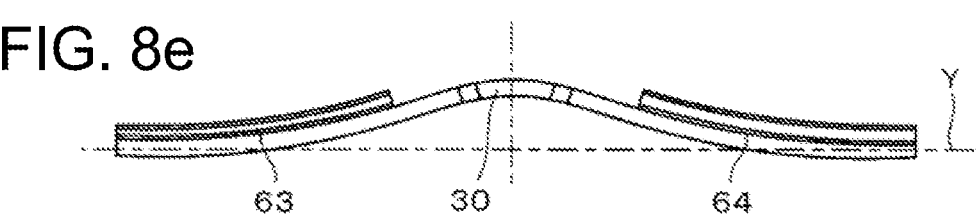

Next, rotation on the Y-axis will be described. When voltage in the extending direction is applied to both of piezoelectric elements 51 and 52, because each of unimorph sections 61 and 62 is fixed on and supported by fixed frame 70 at one end, both of the unimorph sections 61 and 62 bend with the other ends displaced downward, as shown in FIG. 8d. On the other hand, when voltage with the opposing phase (voltage in the shrinking direction) to piezoelectric elements 51 and 52 is applied to both of piezoelectric elements 53 and 54, because each of unimorph sections 63 and 64 is fixed on and supported by fixed frame 70 at one end, both of the unimorph sections 63 and 64 bend with the other ends displaced upward, as shown in FIG. 8e. In FIG. 8e, illustration of mirror section 10 is omitted for convenience. As can be seen, running torque around the Y-axis acts on movable frame 30, and movable frame 30 is tilted on the Y-axis.

When alternating voltage which keeps the above-descried phase relationship is applied to piezoelectric elements 51 through 54, each of unimorph sections 61 through 64 repeatedly oscillates in the vertical direction, following the alternating voltage. Then, running torque acts on movable frame 30 as a movement of a seesaw, and movable frame 30 rotationally oscillates to incline up to a predetermined displacement angle on the Y-axis. Thus, by applying the predetermined voltage to each of four unimorph sections 61 through 64, tilt on the X-axis and Y-axis of mirror section 10 which is supported by movable frame 30 can be controlled arbitrary.

(3. Spot Shape Correction)

Next, correction of the spot shape of a beam projected on screen SC, will be described.

When the scanning projection device projects a beam on the scan surface, a spot shape on the image area changes corresponding to the amount of oblique projection angle to the scan surface. That is, as shown in FIG. 9a, when a beam perpendicularly enters screen SC which is the scan surface, spot SP1 formed of the beam on the image area has a shape of perfect circle. On the other hand, as shown in FIG. 9b, when a beam obliquely enters screen SC, spot SP2 formed of the beam on the image area has a shape of ellipse.

FIG. 10 is a graph showing a relationship between an incident angle and a spot size measured when the incident angle of a beam entering screen SC is changed by an inclination change of screen SC under the condition that, in scanning projection device PJ of the first embodiment, projection optical system 7 is removed and deflection angle of deflection element 3 is set to be zero degrees in both of the vertical and horizontal directions. The spot size shown on the longitudinal axis is calculated by normalizing the vertical spot size by the spot size at the angle of zero degree.

As shown in FIG. 10, the more the incident angle $\theta$in of a beam entering screen SC increases, the more the vertical spot size is enlarged. At that time, the normalized spot sizes at every incident angles $\theta$in are substantially fitted to the reciprocal numbers of cosine ($1/\cos \theta$in) of incident angles $\theta$in of a beam which perpendicularly enters screen SC. That is, the spot size on the image area increases in the vertical direction by a ratio of about $1/\cos \theta$in. The spot size increases depending on the incident angle $\theta$in to screen SC. When a beam is projected obliquely, the spot is enlarged significantly in a direction in which the beam is projected obliquely (generally, in the vertical direction).

The resolution on the image area is deteriorated in the direction in which the spot is enlarged. Therefore, when a beam is projected obliquely, the resolution differs between in the vertical direction and the horizontal direction. Thus, by setting the focal length in the horizontal direction larger than the focal length in the vertical direction, the spot shape can be corrected and the resolution difference between in the vertical direction and horizontal direction can be corrected. Details of this issue will be described below.

Scanning projection device PJ of each of the first to third embodiments, is structured to satisfy the following conditional expressions (1) and (2).

$$5 < \theta in < 60 \quad (1)$$

$$1.0 < A/(B \times C) < 2.5 \quad (2)$$

In these expressions, the following expressions hold:

$$A = \{Sh/Sv\} \times \tan(2\theta v),$$

$$B = 2 \tan(\theta h) \times \cos^2(\theta in),$$

$$C = 1 - \tan(\theta in) \times \tan(2\theta v),$$

where $\theta in$ is the incident angle,

Sh is a length of the image area on the scan surface in a long-side direction,

Sv is a length of the image area in the short-side direction, $\theta h$ is a maximum optical-scan angle in the long-side direction of the image area, and $\theta v$ is a maximum optical-scan angle in the short-side direction of the image area.

FIG. 11 is a vertical sectional view showing scanning projection device PJ, for example, of the first embodiment, which illustrates incident angle $\theta in$ (°) and length Sv (mm) of the image area in the short-side direction. FIG. 12 is a vertical sectional view showing scanning projection device PJ, for example, of the first embodiment, which illustrates the half of the length Sh of the image area in the long-side direction. As shown in FIG. 11, incident angle $\theta in$ represents an incident angle of a ray entering screen SC at the minimum angle among rays entering screen SC within a cross section which includes the principal ray at the center of the image area and is parallel with the short-side direction of the image area.

The principal ray at the center of the image area means a ray which is emitted from light source unit 1, then passes through the center of a diaphragm (for example, arranged on deflection element 3), and entering the center of the image area on screen SC. The optical path of the principal ray at the center of the image area is bent by the above deflection element 3 and reflection mirrors (first reflection mirror 4 and second reflection mirror 6). Accordingly, the cross section which includes the principal ray at the center of the image area and is parallel with the short-side direction of the image area, can also be represented as the yz-plane which includes the principal ray at the center of the image area and is perpendicular to the image area.

FIG. 13 is a vertical sectional view showing the surroundings of deflection element 3 of scanning projection system device PJ of the first embodiment, for example. The maximum optical-scan angle $\theta v$ (°) in the short-side direction of the image area is defined as the half of an angle formed by two rays just behind deflection element 3, where one of the two rays is a ray which is deflected with deflection element 3 and enters the upper side of the image area, and the other is a ray which is deflected with deflection element 3 and enters the lower side of the image area, measured when deflection element 3 performs deflection and scanning in the short-side direction of the image area.

FIG. 14 is a horizontal sectional view showing the surroundings of deflection element 3 of scanning projection system device PJ of the first embodiment, for example. The maximum optical-scan angle $\theta h$ (°) in the long-side direction of the image area is defined as the half of an angle formed by two rays just behind deflection element 3, where one of the two rays is a ray which is deflected with deflection element 3 and enters the right side of the image area, and the other is a ray which is deflected with deflection element 3 and enters the left side of the image area, measured when deflection element 3 performs deflection and scanning in the long-side direction of the image area.

The conditional expression (1) defines a proper range of the incident angle of a beam obliquely entering screen SC. When the value of the conditional expression (1) is smaller than the lower limit, the incident angle of the beam obliquely entering screen SC becomes small, and projection optical system 7 and the lower side of the image area are located at the almost same height. In such the condition, projection optical system 7 disturbs the observation of images when the scanning projection device works. On the other hand, when the value of the conditional expression (1) exceeds the upper limit, the incident angle increases especially at the upper portion of the image area, and the spot is significantly enlarged in the vertical direction, which makes the correction of the spot shape with scanning projection device PJ using the conditional expression (2) difficult.

Accordingly, by satisfying the conditional expression (1), projection optical system 7 does not disturb the observation of images and the correction of the spot shape with scanning projection device PJ using the conditional expression becomes easier.

Further, when the value of the conditional expression (1) exceeds the upper limit, significant keystone distortion is caused on the image area, and the keystone distortion is hardly corrected with projection optical system PJ. The keystone distortion can also be corrected by a proper setting of the surface shape especially of second reflection mirror 6, which will be described later. For reference, there is provided a graph showing a change in degree of keystone distortion caused when incident angle of a beam entering screen SC is changed, in a structure which is composed only of deflection element 3 and excludes projection optical system 7 in FIG. 15. As can be seen from FIG. 15, the more incident angle $\theta in$ increases, the more significantly keystone distortion becomes.

The degree of keystone distortion is evaluated by an amount calculated by the following expression, where L1 (mm) is a length of a straight line connecting the corner at the upper left of the image area and the corner at the upper right of the image area, and L2 (mm) is a length of a straight line connecting the corner at the lower left of the image area and the corner at the lower right of the image area, as shown in FIG. 16.

Degree of Keystone distortion (%)

$$= \{(L1-L2)/L2\} \times 100$$

When the conditional expression (1) is satisfied, the degree of keystone distortion can be restricted, which enhances the efficiency of light utilization and makes the projected image brighter. That is, a laser beam has been switched off at the edge portion where the image area has a distortion, in order to partially display a rectangular area on screen SC, in the conventional arts. However, the time when laser light has been switched off can be used for displaying an image as its original operation by restricting the keystone distortion, which enhances the efficiency of light utilization. Assuming that the area of displayed image is the same to that of conventional device, scanning speed for one line can be decreased by using the time when laser light has been switched off for displaying an image as its original operation. Thereby, a bright projected image can be obtained.

Further, when the conditional expression (1) is satisfied, the device has a structure such that a beam deflected by deflection element 3 obliquely enters any positions on screen SC (at incident angle θin to the short-side direction of the image area). Accordingly, such the structure further exhibits the effect to reduce the distance from projection optical system 7 to screen SC and to make the entire structure compact.

On the other hand, the conditional direction (2) defines the ratio of magnifications of scanning angle in the vertical direction and the horizontal direction. That is, when the value of the conditional expression (2) is lower than the lower limit, angle magnification in the vertical direction becomes larger than that in the horizontal direction in projection optical system 7, which makes the focal length in the vertical direction longer than that in the horizontal direction. As a result, the spot shape is further elongated in the vertical direction, and it is difficult to correct the spot shape to approach a perfect circle, then to correct the resolution difference. On the contrary, when the value of the conditional expression (2) exceeds the upper limit, the spot shape is excessively corrected (magnified) in the horizontal direction, and the spot is elongated in the horizontal direction.

Accordingly, when the conditional expression (2) is satisfied, the spot shape which has been elongated in the vertical direction on the image area under the condition that a beam is obliquely projected, can be corrected to approach a perfect circle and the resolution difference can be reduced between in the vertical direction and the horizontal direction, which enables to display an excellent and high-quality image even under the condition that the beam is projected obliquely.

The spot shape may be corrected by making the magnification in the vertical direction lower than that in the horizontal direction, to shrink the spot in the vertical direction. This method can also satisfy both the conditional expressions (1) and (2). In other words, by adjusting parameters of the device to satisfy the conditional expressions (1) and (2), the magnification in the vertical direction can be reduced compared with that in the horizontal direction to make the spot in the horizontal direction shrink. In this method, by making the spot which has been elongated in the horizontal direction shrink in the vertical direction to approach a perfect circle, the spot shape becomes small in both the horizontal direction and the vertical direction, which enhances the resolution of a projected image.

Incidentally, each of the first to third embodiments employs the above-described anamorphic lens as incident optical system 2 and guides a beam with different diameters in the vertical direction and the horizontal direction to enter deflection element 3. Such the structure allows more excellent correction such that the spot shape of the beam projected on screen SC is changed in the vertical direction or the horizontal direction and that the spot shape approaches the perfect circle.

In order to correct the distortion of spot shape caused by projecting a beam obliquely in much more excellent condition, it is preferable that the following conditional expression (2a) is satisfied, and it is more preferable that the following conditional expression (2b) is satisfied.

$$1.0 < A/(B \times C) < 2.0 \qquad (2a)$$

$$1.0 < A/(B \times C) < 1.8 \qquad (2b)$$

(4. Examples)

Construction data as Examples 1 through 3 will be provided to explain the examples of scanning projection device PJ of the first to third embodiments, in the following description. Examples 1 through 3 are numerical examples corresponding to the first through third embodiment, respectively. Optical construction diagrams (FIGS. 1 through 6) are applied to the corresponding Example 1 to 3, as they are.

In the following construction data, Si (where i=0, 1, 2, 3 . . . ) represents an i-th surface numbered from the side of light source unit 1. The arrangement of each surface Si is defined by a corresponding surface data of surface vertex coordinates (x, y, z) and a rotational angle (X rotation tilt). The surface vertex is assumed to be positioned at the origin of local Cartesian coordinate system (X, Y, Z), and the coordinates of the surface vertex of surface Si are represented by coordinates (x, y, z) at the origin of the local Cartesian coordinate system (X, Y, Z) in the global Cartesian coordinate system (x, y, z), where unit of the surface vertex coordinates is defined as mm. The tilt of surface Si is represented by rotation angle on the X-axis (X rotation), where the center of the rotation is at the surface vertex (unit of the angle is defined as °, and the positive direction of the rotation angle of the X rotation is the counterclockwise direction, viewed from the positive side of the X axis). These coordinate systems are defined by the right-hand system. The global coordinate system (x, y, z) is the absolute coordinate system conformed to a local Cartesian coordinate system (X, Y, Z) for the surface of diaphragm (S3).

The diaphragm diameter on the diaphragm surface is 1 mm in each of Examples 1 to 3. Refractive index and Abbe number at d-line are represented by Nd and vd, respectively.

Surface Si is formed by a free-formed surface with rotational asymmetry, and is defined by the following expression of Math 1 with a local Cartesian coordinate system (X, Y, Z) whose origin is at the surface vertex.

$$z = \frac{cr^2}{1 + \sqrt{1 - (1+k)c^2 r^2}} + \sum \sum c(i, j) x^i y^j \qquad [\text{Math 1}]$$

In the expression of Math 1, z represents a displacement (measured from the surface vertex) in the Z-axis direction at a position at a height of r, c represents a curvature (which is a reciprocal of curvature radius) at the surface vertex, k represents a conic constant, and c(i, j) represents coefficients of a free-form surface of i-th degree for X and j-th degree for Y. In every examples, c(i, j) is expressed as XiYj. All the coefficients which are not given have a value of zero, and "E–n" is "×10$^{-n}$" in the data.

Example 1

| Surface number | Member | Surface | Surface shape |
|---|---|---|---|
| S1 | Incident optical system (Incident surface) | Refractive surface | Anamorphic |

-continued

| Surface number | Member | Surface | Surface shape |
|---|---|---|---|
| S2 | Incident optical system (Outgoing surface) | Refractive surface | Flat surface |
| S3 | Diaphragm surface | Refractive surface | Flat surface |
| S4 | Deflection element | Reflection surface | Flat surface |
| S5 | First reflection mirror | Reflection surface | Free-form surface |
| S6 | Refractive lens (Incident surface) | Refractive surface | Free-form surface |
| S7 | Refractive lens (Outgoing surface) | Refractive surface | Flat surface |
| S8 | Second reflection mirror | Reflection surface | Free-form surface |
| S9 | Screen surface | | Flat surface |

| Surface number | x | y | z | tilt | Nd | νd |
|---|---|---|---|---|---|---|
| S1 | 0 | 0 | −19.9000 | 0 | 1.487 | 70.4 |
| S2 | 0 | 0 | −19.4000 | 0 | | |
| S3 | 0 | 0 | 0 | 0 | | |
| S4 | 0 | 0 | 0 | −25.9081 | | |
| S5 | 0 | 45.3841 | 6.0108 | −7.3927 | | |
| S6 | 0 | 11.4218 | −7.7563 | 69.6336 | 1.531 | 55.7 |
| S7 | 0 | 12.3593 | −7.4083 | 69.6336 | | |
| S8 | 0 | −67.1920 | 8.2761 | −8.5439 | | |
| S9 | 0 | 190.7152 | −258.8548 | 7.4490 | | |

Surface S5; Free-form surface

| k | 0 | | | |
|---|---|---|---|---|
| Y | 1.85006E−01 | X2 | −1.87641E−02 | Y2 2.41306E−03 |
| X2Y | −1.89662E−04 | Y3 | −4.29630E−08 | X4 1.35324E−05 |
| X2Y2 | 3.50754E−07 | Y4 | −6.43952E−07 | X4Y −1.63386E−06 |
| X2Y3 | −1.88073E−07 | Y5 | 8.33801E−09 | X6 2.45828E−06 |
| X4Y2 | 4.24488E−08 | X2Y4 | 3.20958E−09 | Y6 −4.94327E−11 |
| X6Y | 4.24482E−08 | X4Y3 | −3.99984E−10 | X2Y5 −3.04611E−11 |
| Y7 | −9.90251E−13 | X8 | −1.39506E−07 | X6Y2 1.36407E−09 |
| X4Y4 | −7.31958E−11 | X2Y6 | −2.49371E−12 | Y8 5.43278E−14 |

Surface S6; Free-form surface

| k | 0 | | | |
|---|---|---|---|---|
| Y | −1.27901E−03 | X2 | −9.28872E−04 | Y2 6.63720E−05 |
| X2Y | 5.89863E−06 | Y3 | 5.46470E−06 | X4 −2.83021E−06 |
| X2Y2 | 2.46599E−07 | Y4 | −1.69521E−07 | X4Y −3.50758E−06 |
| X2Y3 | 7.09030E−08 | Y5 | 3.85370E−09 | X6 −2.71185E−07 |
| X4Y2 | −6.64366E−08 | X2Y4 | 1.34858E−09 | Y6 3.21096E−10 |

Surface S8; Free-form surface

| k | 0 | | | |
|---|---|---|---|---|
| Y | −2.60812E−01 | X2 | 5.52000E−02 | Y2 2.95656E−03 |
| X2Y | −8.17688E−04 | Y3 | −7.52391E−07 | X4 −3.87641E−05 |
| X2Y2 | 1.67712E−06 | Y4 | −6.46564E−08 | X4Y 6.35862E−07 |
| X2Y3 | 4.86969E−09 | Y5 | −4.44317E−10 | X6 −1.96747E−07 |
| X4Y2 | 5.36537E−09 | X2Y4 | 5.58255E−12 | Y6 1.81104E−12 |
| X6Y | 8.51521E−10 | X4Y3 | −8.42496E−12 | X2Y5 −5.31038E−13 |
| Y7 | 2.42507E−15 | X8 | −3.07159E−10 | X6Y2 2.46540E−11 |
| X4Y4 | −8.72344E−13 | X2Y6 | 9.50531E−15 | Y8 −4.62201E−19 |

Example 2

| Surface number | Member | Surface | Surface shape |
|---|---|---|---|
| S1 | Incident optical system (Incident surface) | Refractive surface | Anamorphic |
| S2 | Incident optical system (Outgoing surface) | Refractive surface | Flat surface |
| S3 | Diaphragm surface | Refractive surface | Flat surface |
| S4 | Deflection element | Reflection surface | Flat surface |

-continued

| | | | | | | |
|---|---|---|---|---|---|---|
| S5 | First reflection mirror | | Reflection surface | | Free-form surface | |
| S6 | Refractive lens (Incident surface) | | Refractive surface | | Free-form surface | |
| S7 | Refractive lens (Outgoing surface) | | Refractive surface | | Flat surface | |
| S8 | Second reflection mirror | | Reflection surface | | Free-form surface | |
| S9 | Screen surface | | | | Flat surface | |

| Surface number | x | y | z | tilt | Nd | vd |
|---|---|---|---|---|---|---|
| S1 | 0 | 0 | −19.9000 | 0 | 1.487 | 70.4 |
| S2 | 0 | 0 | −19.4000 | 0 | | |
| S3 | 0 | 0 | 0 | 0 | | |
| S4 | 0 | 0 | 0 | −25.7086 | | |
| S5 | 0 | 34.2536 | 4.5430 | −7.9733 | | |
| S6 | 0 | 7.6147 | 2.5686 | 70.2698 | 1.531 | 55.7 |
| S7 | 0 | 8.5559 | 2.9062 | 70.2698 | | |
| S8 | 0 | 6.7434 | 15.0862 | −9.4767 | | |
| S9 | 0 | 79.0200 | 268.2245 | 4.6454 | | |

Surface S5; Free-form surface

| k | 0 | | | |
|---|---|---|---|---|
| Y | 2.01272E−01 | X2 | −1.24437E−02 | Y2 | 1.40177E−03 |
| X2Y | −2.54759E−04 | Y3 | 1.48718E−05 | X4 | −3.82535E−04 |
| X2Y2 | 1.22346E−06 | Y4 | −6.27522E−07 | X4Y | −1.59517E−05 |
| X2Y3 | −1.22288E−07 | Y5 | −4.80306E−09 | X6 | 1.30165E−05 |
| X4Y2 | −1.56775E−07 | X2Y4 | 1.04746E−09 | Y6 | 1.91115E−11 |
| X6Y | 4.93539E−07 | X4Y3 | −1.88469E−09 | X2Y5 | −1.70989E−13 |
| Y7 | −2.41232E−12 | X8 | −1.96012E−07 | X6Y2 | 6.00718E−09 |
| X4Y4 | −1.02504E−11 | X2Y6 | −1.35910E−12 | Y8 | 4.03319E−14 |

Surface S6; Free-form surface

| k | 0 | | | |
|---|---|---|---|---|
| Y | −2.18072E−03 | X2 | −2.09726E−03 | Y2 | 2.16461E−04 |
| X2Y | 3.54635E−06 | Y3 | 1.88538E−05 | X4 | 2.29579E−05 |
| X2Y2 | −1.40692E−05 | Y4 | 1.30500E−07 | X4Y | 2.01578E−06 |
| X2Y3 | −2.54149E−06 | Y5 | −2.70920E−08 | X6 | 1.28865E−08 |
| X4Y2 | 2.11277E−08 | X2Y4 | −1.15208E−07 | Y6 | 1.69494E−05 |
| X6Y | 1.05355E−10 | X4Y3 | −5.77940E−11 | X2Y5 | 1.49040E−11 |
| Y7 | 2.21891E−12 | X8 | −1.91099E−11 | X6Y2 | −4.47339E−12 |
| X4Y4 | 5.89526E−12 | X2Y6 | 7.36385E−13 | Y8 | −2.50458E−16 |

Surface S8; Free-form surface

| k | 0 | | | |
|---|---|---|---|---|
| Y | 6.91900E−03 | X2 | 2.34251E−03 | Y2 | 1.27469E−06 |
| X2Y | −9.21919E−05 | Y3 | 1.18567E−07 | X4 | 6.79710E−06 |
| X2Y2 | −7.11279E−06 | Y4 | 3.45570E−08 | X4Y | −4.86256E−07 |
| X2Y3 | 7.24449E−08 | Y5 | −2.26420E−09 | X6 | 2.79256E−09 |
| X4Y2 | 5.62303E−09 | X2Y4 | 6.26533E−09 | Y6 | −6.70193E−10 |

Example 3

| Surface number | Member | Surface | Surface shape |
|---|---|---|---|
| S1 | Incident optical system (Incident surface) | Refractive surface | Anamorphic |
| S2 | Incident optical system (Outgoing surface) | Refractive surface | Flat surface |
| S3 | Diaphragm surface | Refractive surface | Flat surface |
| S4 | Deflection element | Reflection surface | Flat surface |
| S5 | First reflection mirror | Reflection surface | Free-form surface |
| S6 | Refractive lens (Incident surface) | Refractive surface | Free-form surface |
| S7 | Refractive lens (Outgoing surface) | Refractive surface | Flat surface |

-continued

| | S8 | Second reflection mirror | | Reflection surface | Free-form surface |
|---|---|---|---|---|---|
| | S9 | Screen surface | | | Flat surface |

| Surface number | x | y | z | tilt | Nd | vd |
|---|---|---|---|---|---|---|
| S1 | 0 | 0 | −19.9000 | 0 | 1.513 | 67.7 |
| S2 | 0 | 0 | −19.5000 | 0 | | |
| S3 | 0 | 0 | 0 | 0 | | |
| S4 | 0 | 0 | 0 | −13.1952 | | |
| S5 | 0 | 47.7603 | −5.8927 | −3.1989 | | |
| S6 | 0 | −3.9866 | −3.9866 | 50.4182 | 1.531 | 55.7 |
| S7 | 0 | 5.2681 | −3.6680 | 50.4182 | | |
| S8 | 0 | −77.3592 | 3.1406 | −3.6237 | | |
| S9 | 0 | 307.2258 | −484.8813 | −1.3753 | | |

Surface S5; Free-form surface

| k | 0 | | | |
|---|---|---|---|---|
| Y | 1.55807E−01 | X2 | −1.35381E−02 | Y2 | 2.41843E−03 |
| X2Y | −2.99047E−04 | Y3 | −1.94661E−05 | X4 | 4.09766E−05 |
| X2Y2 | −2.62286E−07 | Y4 | −5.83656E−07 | X4Y | −1.41860E−06 |
| X2Y3 | −7.98256E−08 | Y5 | 7.78319E−09 | X6 | −4.23649E−07 |
| X4Y2 | −3.79711E−08 | X2Y4 | −7.30299E−10 | Y6 | 1.82918E−10 |
| X6Y | −2.20734E−26 | X4Y3 | 1.13922E−10 | X2Y5 | 1.14142E−12 |
| Y7 | 1.62882E−13 | X8 | −6.01979E−27 | X6Y2 | 1.81994E−10 |
| X4Y4 | −4.45798E−12 | X2Y6 | −3.13051E−14 | Y8 | −4.34497E−15 |

Surface S6; Free-form surface

| k | 0 | | | |
|---|---|---|---|---|
| Y | −9.09979E−05 | X2 | −3.72690E−04 | Y2 | 2.53377E−09 |
| X2Y | 7.63926E−05 | Y3 | 2.67749E−07 | X4 | 4.95363E−06 |
| X2Y2 | 2.02322E−06 | Y4 | −1.17859E−06 | X4Y | −1.80538E−06 |
| X2Y3 | 1.30967E−07 | Y5 | 4.44714E−09 | X6 | −1.20022E−08 |
| X4Y2 | −1.32380E−07 | X2Y4 | 6.77809E−08 | Y6 | 5.67911E−09 |

Surface S8; Free-form surface

| k | 0 | | | |
|---|---|---|---|---|
| Y | −2.18117E−01 | X2 | 4.98475E−02 | Y2 | 3.11867E−03 |
| X2Y | −8.60777E−04 | Y3 | −7.54430E−06 | X4 | −3.30037E−06 |
| X2Y2 | 3.17820E−06 | Y4 | 1.94052E−08 | X4Y | 6.21243E−08 |
| X2Y3 | 1.01322E−08 | Y5 | −1.21209E−09 | X6 | −8.59452E−09 |
| X4Y2 | −4.03336E−11 | X2Y4 | −4.13618E−11 | Y6 | 8.37561E−12 |
| X6Y | 2.02912E−18 | X4Y3 | 2.85773E−12 | X2Y5 | −1.54769E−15 |
| Y7 | −3.73294E−15 | X8 | −6.42589E−22 | X6Y2 | 3.61039E−13 |
| X4Y4 | −1.69525E−14 | X2Y6 | −1.15406E−15 | Y8 | −4.79933E−17 |

Table 1 shows values of θin and A/(B×C) which are objects of the above-described conditional expressions (1) and (2) for Examples 1 to 3, which satisfy both the conditional expressions (1) and (2). Therefore, Examples 1 to 3 show that the resolution difference can be reduced and a high-quality and excellent image can be displayed.

TABLE 1

| | Conditional expression (1) θin (°) | Conditional expression (2) A/(B × C) |
|---|---|---|
| Example 1 | 27.50 | 1.57 |
| Example 2 | 26.73 | 1.59 |
| Example 3 | 20.71 | 1.34 |

FIG. 17 is a diagram which shows distortion of the two-dimensionally projected image in Example 1 as a distortion diagram. FIG. 17 just shows the right half of the entire image area, and the entire image area exhibits the distortion with bilateral symmetry. FIGS. 18 through 20 show surface shape of surface S5, surface shape of surface S6, and surface shape of surface S8 in Example 1, respectively. In FIGS. 18 through 20, the values in the X direction and Y direction represent values in the local coordinates, the values in the Z direction represent shift values (displacement) measured from the reference position (0 mm) which is a position where the principal ray at the center of image area enters.

FIG. 21 is a diagram which shows distortion of the two-dimensionally projected image in Example 2 as a distortion diagram. FIGS. 22 through 24 show surface shape of surface S5, surface shape of surface S6, and surface shape of surface S8 in Example 2, respectively. FIG. 25 is a diagram which shows distortion of the two-dimensionally projected image in Example 3 as a distortion diagram. FIGS. 26 through 28 show surface shape of surface S5, surface shape of surface S6, and surface shape of surface S8 in Example 3, respectively. These diagrams are illustrated in the same way to FIGS. 17 through 20 relating to Example 1.

Table 2 shows the maximum scan angle (°) of deflection element 3, mechanical-scan angle used for the projection (°), maximum optical-scan angle (°), and efficient of angle utilization (%) for Examples 1 through 3. When deflection element 3 reflects an incident beam to deflect the beam, the maximum optical-scan angle is twice the mechanical-scan angle physically. As described above, deflection element 3 is sinusoidally driven in the horizontal direction, and a laser beam entering deflection element 3 is switched off for a fixed period of time including a point of time when the velocity of the deflection of the reflection surface becomes zero (a point of time when the deflection angle has the maximum value), in order to prevent the projected image from being bright locally. Therefore, the efficiency of angle utilization in the horizontal direction means a ratio of time for scanning one line in the horizontal direction except the fixed period of time, to the time for scanning one line in the horizontal direction. On the other hand, the efficiency of angle utilization in the vertical direction means a ratio of time from a start of scanning one line in the horizontal direction to a start of scanning on the next line except a period of time for switching the laser beam off before the start of scanning the next line, to the time from a start of scanning on one line in the horizontal direction to start of scanning on the next line.

TABLE 2

Examples 1 to 3

|  | Horizontal direction | Vertical direction |
|---|---|---|
| Maximum scan angle of the deflection element | ±10 degrees | ±8.0 degrees |
| Mechanical-scan angle used for projection | ±9.24 degrees | ±6.4 degrees |
| Maximum optical-scan angle | ±18.48 degrees | ±12.8 degrees |
| Efficiency of angle utilization (in time) | 75% | 80% |

Table 3 shows keystone distortion and TV distortion for Examples 1 to 3. TV distortion is an amount of aberration representing an amount of curve in the frame of image area displayed on screen SC. As shown in FIG. 29, the TV distortion is calculated by dividing displacement (a, b, c, and d) along axes passing the center of the image area by the vertical width A or horizontal with B of the image area. That is, TV distortion on each side of the frame of the image area is represented as follows.

TV distortion on the upper side; a/A×100(%)
TV distortion on the lower side; b/A×100(%)
TV distortion on the left side; c/B×100(%)
TV distortion on the right side; d/B×100(%)

As for the sign of TV distortion, the direction that each side bends apart from the center of the image area (each side becomes convex) is defined as positive, and the direction that each side bends toward the center of the image area (each side becomes concave) is defined as negative.

TABLE 3

|  | Example 1 | Example 2 | Example 3 |
|---|---|---|---|
| Keystone distortion | 0.1 | 0.8 | 8.3 |
| TV distortion on the upper side (%) | 0.2 | 0.7 | −0.6 |
| TV distortion on the lower side (%) | −0.4 | −0.2 | 1.4 |
| TV distortion on the left side (%) | −0.1 | 0.1 | 1.1 |
| TV distortion on the right side (%) | −0.1 | 0.1 | 1.1 |

In a two-dimensional scanning system, the following distortions with rotational asymmetry are generated on the image area: for example, distortion in convex shape toward the lower direction caused in scanning operation (scan distortion), and keystone distortion caused in oblique projection. However, as can be seen from Examples 1 through 3, these distortions can be corrected easily by providing at least one free-form surface with rotational asymmetry in projection optical system 7. Especially, by employing free-form surfaces with rotational asymmetry for surface S5, surface S6, and surface S8 in projection optical system 7, the effect is surely exhibited.

By employing at least three surfaces with curvature: surface S5, surface S6, and surface S8 in projection optical system 7, it can also be say that distortions such that curvature of field, keystone distortion, and scan distortion can be corrected with image forming property kept satisfactorily.

(Surface S8)

Details of surface S8 which is one of reflection surfaces provided in projection optical system 7 in Examples 1 through 3, will be described below, referring with FIGS. 20, 24 and 28 which were described above.

For convenience in the following description, on surface S8, first area R1 is defined as an area where a ray entering the lower side of the image area intersects with the surface S8 within a cross section which includes the principal ray at the center of the image area and is parallel with the short-side direction of the image area, and second area R2 is defined as an area where a ray entering the upper side of the image area intersects with the surface S8 within the cross section. The lower side of the image area means a side which is parallel with the long side of the image area and which includes an intersection of screen SC and a ray with the minimum incident angle to screen SC within a cross section which includes the principal ray at the center of the image area and is parallel with the short side of the image area. The upper side of the image area means a side which is parallel with the long side of the image area and which includes an intersection of screen SC and a ray with the maximum incident angle to screen SC within the cross section.

The positive and negative directions of curvature are defined as follows. That is, as shown in FIG. 30, it is considered that surface S which is formed by a reflection surface or a refractive surface exists in an optical path of light LT which is emitted from light source unit 1 and travels toward screen SC through deflection element 3. When light LT meet surface S as a convex surface, curvature of such the surface S is defined as positive (see an example shown in FIG. 30). When light LT meet surface S as a concave surface, curvature of such the surface S is defined as negative.

Curvature can be uniquely defined by a surface shape (that is, curvature is a reciprocal of curvature radius). On the other hand, power represents a degree of the change in a traveling direction of a ray caused by a surface where the ray enters. The power is defined with depending on an incident position of the ray and an incident angle, additionally to the surface shape. In other words, curvature can be defined only by a surface shape but power cannot be defined only by a surface shape. From this viewpoint, curvature and power are used with making a distinction of them in the present specification.

In Examples 1 through 3, surface S8 is asymmetric about the above cross section and has a shape such that first area R1 protrudes to the side from which a ray enters (a shape with a positive curvature). The surface shape at a cross section which passes through the first area R1 and is perpendicular to the first scanning direction (which corresponds to the Y direction) has a larger positive curvature than a surface shape at a cross section which passes through the second area R2 and is perpendicular to the first scanning direction.

By providing projection optical system 7 including such the surface S8 as a reflection surface, an optical path can be folded with the reflection surface, which enables projection optical system to have a compact structure. Further, it does not cause a chromatic aberration which is caused when an refractive surface is employed as described above.

In the structure that a beam is obliquely projected toward screen SC, as described above, the more the incident angle of a ray to screen SC increases, the more keystone distortion is caused (See FIG. 15). However, by employing the reflection surface (surface S8) in the above-described shape in projection optical system 7, the reflection surface can have larger negative power in the second scanning direction (corresponding to the X direction) within the cross section which intersects with the first area R1 and is perpendicular to the first scanning direction, which increases the width of the lower side of the image area in the second scanning direction and to correct keystone distortion caused when the beam is projected obliquely.

In surface S8, the surface shape in the cross section which passes through second area R2 and is perpendicular to the first scanning direction, can be convex or concave facing a side from which a ray enters. Briefly, in surface S8, the convex shape along the second scanning direction can become gentler at a position which moves further from the first area R1 toward the second area R2 (the curvature in the cross section perpendicular to the first scanning direction can change in the negative direction). When the surface shape of surface S8 is defined in such the way, the power in the second scanning direction within the cross section which passes through the first area R1 and is perpendicular to the first scanning direction, can have larger value toward the negative direction than the power in the second scanning direction in the cross section which passes through the second area R2 and is perpendicular to the first scanning direction, which enables to correct keystone distortion.

In Examples 1 through 3, surface S8 has a shape in which a inclination of the surface becomes larger, namely, curvature becomes larger toward the positive direction, at a point which starts at the first area R1 and moves in a direction which is the second scanning direction and is the direction that the point becomes further from the cross section including the principal ray at the center of the image area. Thereby, the negative power can be increased as the point moves toward the above direction, which securely increases the width of the lower side of the image area in the second scanning direction and enables to securely correct keystone distortion.

Such the surface S8 is arranged at the closest position to screen SC in projection optical system 7. At the position closest to screen SC in the above optical path, an incident ray and reflected ray can be largely separated at each angle of view. Therefore, by arranging the surface S8 at such the place, keystone distortion can be corrected effectively.

In Expression 1 through 3, surface S8 has a shape that curvature changes in the negative direction at a point which starts at the second area R2 and moves in a direction which is the second scanning direction and is a direction that the point becomes further from the cross section including the principal ray at the center of the image area. By scanning two-dimensionally the image area with deflection element 3, one line along the second scanning direction on the image area is curved, in other words, scan distortion is caused. The scan distortion more remarkably appears as an angle of oblique projection becomes larger, namely at the upper portion of the image area. By defining the shape of surface S8 as described above, the power in the second scanning direction can change toward the positive direction at a position which goes from the second area R2 toward the outside in the second scanning direction (for example, the negative power can be reduced by reducing the positive curvature radius), which enables to correct the scan distortion.

(Surface S5)

Next, surface S5 which is another reflection surface in projection optical system 7 in Examples 1 through 3, will be described.

Projection optical system 7 in Examples 1 through 3, includes surface S5 as a first reflection surface additionally to the surface S8 as the second reflection surface. Then, as shown in FIGS. 1 through 6, the optical path is folded with the surfaces S8 and S5 to be included within a cross section which includes the principal ray at the center of the image area and is parallel with the short-side direction of the image area, which reduce the thickness of projection optical system 7 to be compact and enables to downsize the whole device.

In surface S5 shown in FIG. 18, FIG. 22, and FIG. 26, the curvature along the second scanning direction (corresponding to the X direction) at a position around intersection P1 of the ray entering the lower side of the image area with the surface S5, becomes larger toward the negative direction than the curvature along the second scanning direction at a position around intersection P2 of a ray entering the upper side of the image area with the surface S5, within the cross section which includes the principal ray at the center of the image area and is parallel with the short-side direction of the image area.

In a system in which a beam is projected at larger angle, a difference in optical path of a ray entering the upper side of the image area and a ray entering the lower side of the image area becomes large, which results in generating curvature of field. For correcting keystone distortion, the ray entering the lower side of the image area passes surface S8 which has a strong positive curvature in the second scanning direction, as described above. Thus, by defining the curvature of surface S5 as described above, the ray entering the lower side of the image area can have a shorter focal length around the principal ray than the ray entering the upper side of the image area, which enables to correct curvature of field with keeping an effect correcting keystone distortion by surface S8.

In the above descriptions, screen SC is employed as a scan surface on which scanning projection device PJ projects a beam. Alternatively, the scan surface can be a wall. Further, a projection image display apparatus can be formed with scanning projection device PJ and screen SC.

INDUSTRIAL APPLICABILITY

The scanning projection device of the present invention can be applicable to devices such as a pocket projector, data projector, and rear projection television.

The invention claimed is:

1. A scanning projection device comprising:
a light source unit;
a deflection member deflecting a beam emitted from the light source unit in a first scanning direction and a second scanning direction which are perpendicular to each other; and
a projection optical system guiding the beam deflected by the deflection member onto a scan surface,
wherein the scanning projection device two-dimensionally scans an image area on the scan surface with the beam,
the first scanning direction is identical with a short-side direction of the image area on the scan surface, and
the scanning projection device satisfies the following conditional expressions (1) and (2):

$$5 < \theta_{in} < 60 \quad (1),$$

$$1.0 < A/(B \times C) < 2.5 \quad (2),$$

where $A = \{Sh/Sv\} \times \tan(2\theta v)$, $B = 2\tan(\theta h) \times \cos^2(\theta in)$, $C = 1 - \tan(\theta in) \times \tan(2\theta v)$, θin is an incident angle of a ray entering the scan surface at a minimum angle among rays entering the scan surface within a cross section which includes a principal ray at a center of the image area and is parallel with the short-side direction of the image area, Sh is a length of the image area on the scan surface in a long-side direction, Sv is a length of the image area in the short-side direction, θh is a maximum optical-scan angle in the long-side direction of the image area, and θv is a maximum optical-scan angle in the short-side direction of the image area, and wherein the principal ray at the center of the image area means a ray which is emitted from the light source unit, then passes a center of a diaphragm, and enters the center of the image area on the scan surface.

2. The scanning projection device of claim 1, wherein the scanning projection device satisfies the following conditional expression (2a):

$1.0 < A/(B \times C) < 2.0$       (2a)

3. The scanning projection device of claim 1, wherein the projection optical system comprises at least one free-form surface with rotational asymmetry.

4. The scanning projection device of claim 1, wherein the projection optical system comprises a reflection surface, and wherein, on the reflection surface, a first area is defined as an area where a ray entering a lower side of an image area intersects with the reflection surface within a cross section which includes the principal ray at the center of the image surface and is parallel with the short-side direction of the image area, and a second area is defined as an area where a ray entering an upper side of the image area intersects with the reflection surface within the cross section, and wherein the reflection surface is symmetrical about the cross section, and has a shape that the first area protrudes toward a side from which a ray enters, and the reflection surface has a shape with larger positive curvature at a cross section which passes through the first area and is perpendicular to the first scanning direction, than a shape at a cross section which passes through the second area and is perpendicular to the first scanning direction.

5. The scanning projection device of claim 4, wherein the reflection surface has a shape that a curvature becomes larger in a positive direction at a point moving from the first area in a direction which is the second scanning direction and is a direction that the point becomes more distant from the cross section including the principal ray at the center of the image area.

6. The scanning projection device of claim 4, wherein the reflection surface is arranged at a position closest to the scan surface.

7. The scanning projection device of claim 4, wherein the reflection surface has a shape that the curvature changes in a negative direction at a point moving from the second area in a direction which is the second scanning direction and is a direction that the point becomes more distant from the cross section including the principal ray at the center of the image area.

8. The scanning projection device of claim 4, wherein the reflection surface is defined as a second reflection surface, and the projection optical system further comprises a first reflection surface, and wherein an optical path of the projection optical system is folded by the first reflection surface and the second reflection surface to be included in a cross section which includes the principal ray at the center of the image area and is parallel with the short-side direction of the image area.

9. The scanning projection device of claim 8, wherein, on the first reflection surface, a curvature along the second scanning direction at a position around an intersection of a ray entering a lower side of an image area with the first reflection surface, is larger in a negative direction than a curvature along the second scanning surface at a position around an intersection of a ray entering an upper side of the image area with the first reflection surface, within a cross section which includes the principal ray at the center of the image area and is parallel with the short-direction of the image area.

10. The scanning projection device of claim 9, wherein the projection optical system includes at least three surfaces with curvature.

11. The scanning projection device of claim 1, further comprising an incident optical system guiding the beam emitted from the light source unit to the deflection member, wherein the incident optical system comprises an anamorphic lens whose curvature differs between in the first scanning direction and in the second scanning direction.

* * * * *

UNITED STATES PATENT AND TRADEMARK OFFICE
CERTIFICATE OF CORRECTION

| | |
|---|---|
| PATENT NO. | : 7,880,948 B2 |
| APPLICATION NO. | : 12/679111 |
| DATED | : February 1, 2011 |
| INVENTOR(S) | : Keiko Yamada |

It is certified that error appears in the above-identified patent and that said Letters Patent is hereby corrected as shown below:

Column 25:
Line 27, claim 2, delete "$1.0<A/(B\times C)<2.0$    (2a)"
and insert -- $1.0<A/(B\times C)<2.0$    (2a). --.

Signed and Sealed this
Nineteenth Day of April, 2011

David J. Kappos
*Director of the United States Patent and Trademark Office*